(12) United States Patent
Obama

(10) Patent No.: US 6,771,430 B2
(45) Date of Patent: Aug. 3, 2004

(54) ZOOM LENS SYSTEM

(75) Inventor: Akihiko Obama, Sakura (JP)

(73) Assignee: Nikon Corporation, Tokyo (JP)

( * ) Notice: Subject to any disclaimer, the term of this patent is extended or adjusted under 35 U.S.C. 154(b) by 19 days.

(21) Appl. No.: 10/244,424

(22) Filed: Sep. 17, 2002

(65) Prior Publication Data

US 2003/0072088 A1 Apr. 17, 2003

(30) Foreign Application Priority Data

Sep. 28, 2001 (JP) ....................................... 2001-304454
Sep. 28, 2001 (JP) ....................................... 2001-304524

(51) Int. Cl.[7] .............................................. G02B 15/14
(52) U.S. Cl. ........................ 359/682; 359/691; 359/740
(58) Field of Search ................................. 359/680–682, 359/676, 683, 687–688, 690–691, 738–740

(56) References Cited

U.S. PATENT DOCUMENTS

| | | | |
|---|---|---|---|
| 6,124,984 A | 9/2000 | Shibayama et al. | 359/689 |
| 6,304,389 B1 | 10/2001 | Shibayama | 359/689 |
| 6,349,002 B1 | 2/2002 | Shibayama et al. | 359/689 |
| 6,614,599 B1 * | 9/2003 | Watanabe | 359/689 |
| 6,643,072 B2 * | 11/2003 | Mihara | 359/686 |
| 2002/0012174 A1 * | 1/2002 | Horiuchi | 359/687 |

FOREIGN PATENT DOCUMENTS

JP          11-23967          1/1999

* cited by examiner

*Primary Examiner*—Jordan M. Schwartz
(74) *Attorney, Agent, or Firm*—Miles & Stockbridge P.C.

(57) ABSTRACT

According to one aspect of the present invention, a zoom lens system includes, in order from an object along an optical axis, a first lens group having negative refractive power, and a second lens group having positive refractive power. A distance between the first lens group and the second lens group decreases when the state of lens group positions varies from a wide-angle end state to a telephoto end state. The second lens group is composed of, in order from the object, a first lens having positive refractive power, a first cemented lens having negative refractive power, and a second cemented lens having positive refractive power. The first cemented lens in the second lens group is constructed by a positive lens cemented with a negative lens. The second cemented lens in the second lens group is constructed by a negative lens cemented with a positive lens.

4 Claims, 24 Drawing Sheets

ZOOM LENS SYSTEM

The disclosures of the following priority applications are herein incorporated by reference:
Japanese Patent Application No. 2001-304454 filed Sep. 28, 2001; and
Japanese Patent Application No. 2001-304524 filed Sep. 28, 2001.

BACKGROUND OF THE INVENTION

1. Field of the Invention

The present invention relates to a compact zoom lens system having a zoom ratio about two to four, a small amount of chromatic aberration, and high optical performance across the entire image, suitable for a video camera and an electronic still camera using an imaging device such as a solid state imaging device.

2. Related Background Art

A lot of zoom lens systems suitable for a video camera and an electronic still camera using an imaging device such as a solid state imaging device have been proposed. Among them, the majority of the zoom lens systems having a zoom ratio about two to four is a zoom lens type having a negative lens to the most object side of the lens system. For example, there is a zoom lens system disclosed in Japanese Patent Application Laid-Open No. 11-23967.

In recent years, the number of image pixels used in a video camera and an electronic still camera using an imaging device such as a solid state imaging device has steadily been increasing. In accordance with the trend, the lens system has been requested to have higher optical performance across the entire image. In particular, the lens system has been requested to reduce flare component and chromatic aberration as well as have high optical performance in the periphery.

However, the zoom lens systems disclosed in Japanese Patent Application Laid-Open No. 11-23967 and the like have had a problem not to have sufficient ability to reduce flare component or chromatic aberration across the entire image.

SUMMARY OF THE INVENTION

The present invention is made in view of the aforementioned problem and has an object to provide a zoom lens system having a zoom ratio about two to four, a small amount of chromatic aberration, and high optical performance across the entire image, suitable for a video camera and an electronic still camera using an imaging device such as a solid state imaging device.

According to one aspect of the present invention, a zoom lens system includes, in order from an object along an optical axis, a first lens group G1 having negative refractive power, and a second lens group G2 having positive refractive power. A distance between the first lens group G1 and the second lens group G2 decreases when the state of lens group positions varies from a wide-angle end state W to a telephoto end state T. The second lens group G2 is composed of, in order from the object, a first lens U21 having positive refractive power, a first cemented lens U22 having negative refractive power, and a second cemented lens U23 having positive refractive power. The first cemented lens U22 in the second lens group G2 is constructed by a positive lens U22P cemented with a negative lens U22N. The second cemented lens U23 in the second lens group G2 is constructed by a negative lens U23N cemented with a positive lens U23P.

In one preferred embodiment of the present invention, the zoom lens system further includes a third lens group G3 having positive refractive power located to an image side of the second lens group G2. The third lens group G3 is substantially fixed relative to the image plane when the state of lens group positions varies from the wide-angle end state to the telephoto end state.

In one preferred embodiment of the present invention, the following conditional expressions are satisfied;

$$0.80 < f2/|f22| < 1.70 \tag{1}$$

$$1.40 < f23/|f22| < 3.50 \tag{2}$$

where f2 denotes the focal length of the second lens group G2, f22 denotes the focal length of the first cemented lens U22 in the second lens group G2, and f23 denotes the focal length of the second cemented lens U23 in the second lens group G2.

In one preferred embodiment of the present invention, the following conditional expressions are satisfied;

$$n23N - n23P > 0.13 \tag{3}$$

$$\nu23P - \nu23N > 15 \tag{4}$$

where n23P denotes the refractive index at d-line ($\lambda$=587.6 nm) of the positive lens U23P in the second cemented lens U23 in the second lens group G2, n23N denotes the refractive index at d-line of the negative lens U23N in the second cemented lens U23 in the second lens group G2, $\nu$23P denotes Abbe number of the positive lens U23P in the second cemented lens U23 in the second lens group G2, and $\nu$23N denotes Abbe number of the negative lens U23N in the second cemented lens U23 in the second lens group G2.

In one preferred embodiment of the present invention, at least one surface of the first lens U21 in the second lens group G2 is an aspherical surface having the shape that the refractive power becomes weak as the height separates from the optical axis.

According to another aspect of the present invention, a zoom lens system includes, in order from an object along an optical axis, a first lens group G1 having negative refractive power, and a second lens group G2 having positive refractive power. A fixed stop FS (by the term "fixed stop" in this specification is meant a stop whose aperture diameter is not variable) is arranged between the first lens group G1 and the second lens group G2. A distance between the first lens group G1 and the second lens group G2 decreases when the state of lens group positions varies from a wide-angle end state W to a telephoto end state T. When the state of lens group positions varies from the wide-angle end state W to a certain intermediate focal length state M, a distance between the first lens group G1 and the fixed stop FS decreases as the fixed stop FS is moved with the second lens group G2 in a body. When the state of lens group positions varies from the certain intermediate focal length state M to the telephoto end state T, a distance between the second lens group G2 and the fixed stop FS decreases as the fixed stop FS is moved with the first lens group G1 in a body.

In one preferred embodiment of the present invention, the second lens group G2 has an aperture stop S and the following conditional expressions are satisfied;

$$0.80 < fM/(fW \cdot fT)^{1/2} < 1.30 \tag{5}$$

$$0.25 < D2W/(D1W + D2W) < 0.65 \tag{6}$$

$$\phi FS \cdot FNOT/fT > 1.40 \tag{7}$$

$$\phi FS/\phi ST < 1.20 \tag{8}$$

where fW denotes the focal length of the zoom lens system in the wide-angle end state W, fM denotes the focal length of the certain intermediate focal length state M, fT denotes the focal length of the zoom lens system in the telephoto end state T, D1W denotes the distance between the most image side surface of the first lens group G1 and the fixed stop FS in the wide-angle end state W, D2W denotes the distance between the fixed stop FS and the most object side surface of the second lens group G2 in the wide-angle end state W, FNOT denotes f-number of the zoom lens system in the telephoto end state T, φFS denotes the diameter of the fixed stop FS, and φST denotes the maximum diameter of the aperture stop S in the telephoto end state T.

DESCRIPTION OF THE PREFERRED EMBODIMENTS

Figure 1:
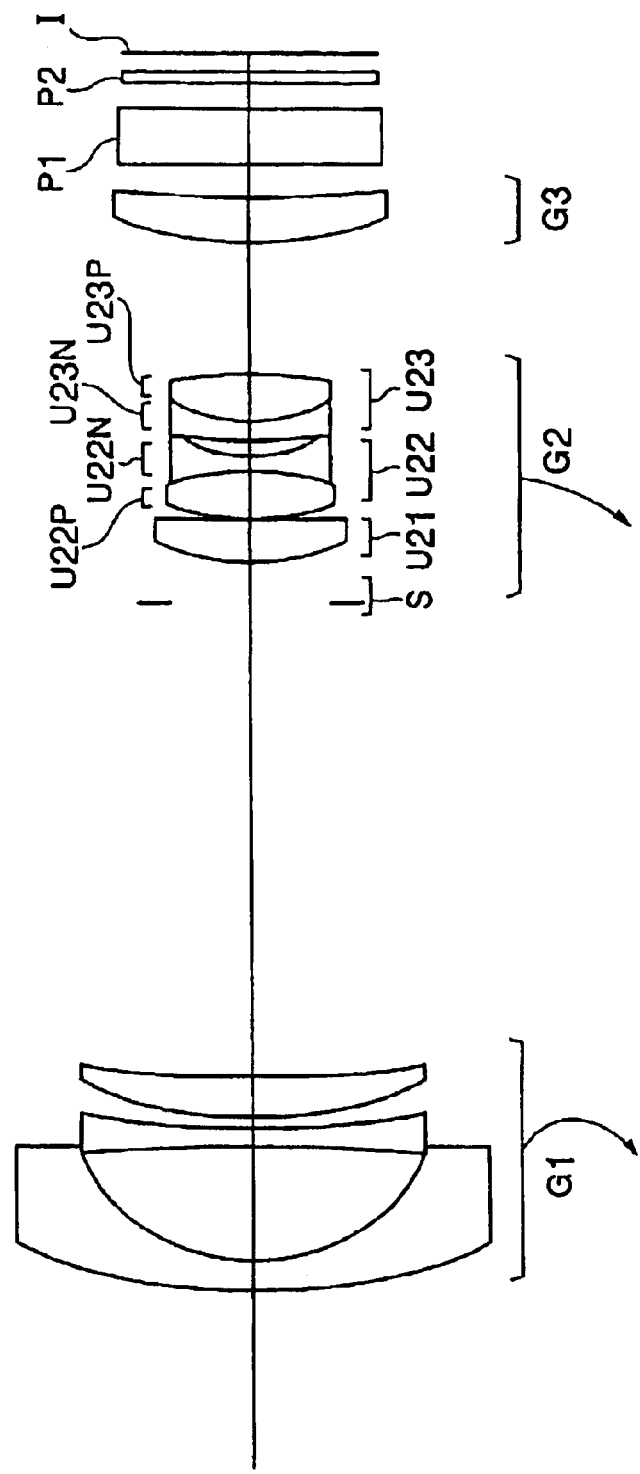
FIG. 1 is a sectional view showing the lens arrangement of a zoom lens system according to Example 1 of a first embodiment of the present invention.

The present invention provides a zoom lens system including, in order from an object along an optical axis, a first lens group G1 having negative refractive power, and a second lens group G2 having positive refractive power, wherein a space between the first lens group G1 and the second lens group G2 decreases when the state of lens group positions varies from a wide-angle end state to a telephoto end state.

The reason why the lens system has the construction above is that in a video camera and an electronic still camera using an imaging device such as a solid state imaging device, it is necessary for the exit pupil of the lens system to be located far away from the image plane in accordance with the characteristic of the solid state imaging device. Accordingly, it is preferable that a lens group, including the second lens group, inclusive of a third and further lens groups located at the image side of the second lens group, when such third and further lens group(s) other than the first and second lens groups exist, has positive refractive power as a whole. Thus, the position of the exit pupil locates far away from the image plane to satisfy the requirement above.

[First Embodiment]

The lens configuration of the second lens group G2 is explained. In a zoom lens system, such as the present invention, including a first lens group G1 having negative refractive power and a second lens group G2 having positive refractive power, the optical performance of the zoom lens system heavily owes to the configuration of the second lens group G2. Although the zoom lens system as a whole has positive refractive power, the first lens group G1 has negative refractive power, so that the positive refractive power of the second lens group G2 inevitably becomes strong for imaging. Consequently, the numerical aperture (NA) becomes large to be liable to produce aberrations.

In the first embodiment of the present invention, the second lens group G2 is composed of, in order from the object along the optical axis, a lens U21 having positive refractive power, a first cemented lens U22 having negative refractive power as a whole, and a second cemented lens U23 having positive refractive power as a whole.

Thus, the power distribution of the lens system nearly becomes so-called "symmetrical type", so that higher optical performance is obtained by reducing both on-axis aberration and off-axis aberration.

The first cemented lens U22 in the second lens group G2 is constructed by a lens U22P having positive refractive power cemented with a lens U22N having negative refractive power. The second cemented lens U23 in the second lens group G2 is constructed by a lens U23N having negative refractive power cemented with a lens U23P having positive refractive power.

Consequently, the amount of chromatic aberration produced in the second lens group G2 as a whole is drastically reduced by the lens construction.

In addition, the zoom lens system includes a third lens group G3 locating to the image side of the second lens group G2. It is preferable that the third lens group G3 is substantially fixed relative to the image plane when the state of the lens group positions varies from the wide-angle end state to the telephoto end state. By using the construction, the position of the exit pupil can be located far away from the image plane. Accordingly, the characteristic for the solid state imaging device improves, so that the higher optical performance can be achieved.

It is preferable to satisfy the following conditional expressions (1) and (2);

$$0.80 < f2/|f22| < 1.70 \quad (1)$$

$$1.40 < f23/|f22| < 3.50 \quad (2)$$

where f2 denotes the focal length of the second lens group G2, f22 denotes the focal length of the first cemented lens U22 in the second lens group G2, and f23 denotes the focal length of the second cemented lens U23 in the second lens group G2.

Conditional expression (1) defines an appropriate range of the ratio of the focal length of the second lens group G2 to that of the first cemented lens U22.

When the ratio exceeds the upper limit of conditional expression (1), in other words, when the refractive power of the first cemented lens U22 becomes excessively strong relative to that of the second lens group G2, positive spherical aberration produced by the first cemented lens U22 becomes excessively large. Consequently, the spherical aberration cannot be corrected by the other lenses, so that a large amount of spherical aberration is left uncorrected. Therefore, higher optical performance cannot be achieved. In this case, since the refractive power of the image side lens surface of the first cemented lens U22 becomes large, lateral chromatic aberration produced by the surface becomes extremely large. Consequently, the lateral chromatic aberration cannot be corrected by the other lenses, so that a large amount of lateral chromatic aberration is left uncorrected. Accordingly, the purpose of the present invention to reduce chromatic aberration cannot be achieved.

On the other hand, when the ratio falls below the lower limit of conditional expression (1), in other words, when the refractive power of the first cemented lens U22 becomes excessively weak relative to that of the second lens group G2, positive spherical aberration produced by the first cemented lens U22 becomes excessively small. Consequently, negative spherical aberration produced by the other lenses cannot be corrected, so that spherical aberration is left uncorrected. Therefore, higher optical performance cannot be achieved.

Conditional expression (2) defines an appropriate range of the ratio of the focal length of the second cemented lens U23 to that of the first cemented lens U22.

When the ratio exceeds the upper limit of conditional expression (2), in other words, when the refractive power of the second cemented lens U23 becomes excessively weak relative to that of the first cemented lens U22, positive refractive power of the lens U21 becomes needed to be strong in order for the second lens group G2 as a whole to obtain appropriate positive refractive power. Consequently, the power distribution largely slips off from that of the symmetrical type, which is advantageous for aberration correction, so that aberrations cannot be corrected sufficiently. Therefore, higher optical performance cannot be achieved.

On the other hand, when the ratio falls below the lower limit of conditional expression (2), in other words, when the refractive power of the second cemented lens U23 becomes excessively strong relative to that of the first cemented lens U22, the major part of the positive refractive power necessary for the second lens group G2 as a whole is born by the second cemented lens U23, so that positive refractive power of the lens U21 becomes relatively small. Consequently, the power distribution largely slips off from that of the symmetrical type, which is advantageous for aberration correction, so that aberrations cannot be corrected sufficiently. Therefore, higher-optical performance cannot be achieved.

In addition, it is preferable that the following conditional expressions (3) and (4) are satisfied;

$$n23N - n23P > 0.13 \quad (3)$$

$$v23P - v23N > 15 \quad (4)$$

where n23P denotes the refractive index at d-line ($\lambda = 587.6$ nm) of the positive lens U23P in the second cemented lens U23 in the second lens group G2, n23N denotes the refractive index at d-line ($\lambda = 587.6$ nm) of the negative lens U23N in the second cemented lens U23 in the second lens group G2, v23P denotes Abbe number of the positive lens U23P in the second cemented lens U23 in the second lens group G2, and v23N denotes Abbe number of the negative lens U23N in the second cemented lens U23 in the second lens group G2.

Conditional expression (3) defines an appropriate range of the difference in the refractive index between the positive lens U23P and the negative lens U23N consisting of the second cemented lens U23.

When the difference falls below the lower limit of conditional expression (3), in other words, when the difference in the refractive index between the positive lens U23P and the negative lens U23N becomes extremely small, chromatic correction effect of the second cemented lens U23 becomes weak. In order to obtain sufficient chromatic correction effect, the curvature of the cemented surface of the lenses U23P and U23N becomes extremely large, so that the amount of aberration produced by the surface becomes large. Accordingly, not only higher optical performance cannot be obtained, but also the thickness of the lens U23P along the optical axis becomes large in order to secure the edge thickness of the lens. As a result, a compact zoom lens system cannot be accomplished.

Conditional expression (4) defines an appropriate range of the difference in Abbe number between the positive lens U23P and the negative lens U23N consisting of the second cemented lens U23.

When the difference falls below the lower limit of conditional expression (4), in other words, when the difference in Abbe number between the positive lens U23P and the negative lens U23N becomes extremely small, chromatic correction effect of the second cemented lens U23 becomes weak. In order to obtain sufficient chromatic correction effect, the curvature of the cemented surface of the lenses U23P and U23N becomes extremely large, so that the amount of aberration produced by the surface becomes large. Accordingly, not only higher optical performance cannot be obtained, but also the thickness of the lens U23P along the optical axis becomes large in order to secure the edge thickness of the lens. As a result, a compact zoom lens system cannot be accomplished.

Moreover, it is preferable that at least one surface of the lens U21 in the second lens group G2 is an aspherical surface having the shape that the refractive power becomes weak as the height separates from the optical axis.

Thus negative spherical aberration produced by the lens U21 can be reduced. Accordingly, since spherical aberration produced by the second lens group G2 as a whole can effectively be reduced, the higher optical performance can be achieved.

It is possible for the zoom lens system according to the present invention to move the image in the image plane by moving a portion or all of lens groups to the direction perpendicular to the optical axis. By using this effect, the zoom lens system according to the present invention can be used for a so-called anti-vibration lens.

Numerical examples according to the first embodiment of the present invention is explained below with reference to accompanying drawings.

EXAMPLE 1

FIG. 1 is a sectional view showing the lens arrangement of a zoom lens system according to Example 1 of the first embodiment of the present invention. The zoom lens system is composed of, in order from an object along an optical axis, a first lens group G1 having negative refractive power, a second lens group G2 having positive refractive power, and a third lens group G3 having positive refractive power.

The first lens group G1 is composed of, in order from the object, a negative meniscus lens having a convex surface facing to the object and an aspherical surface facing to an image, a double concave negative lens having a stronger concave surface facing to the image, and a positive meniscus lens having a convex surface facing to the object.

The second lens group G2 is composed of, in order from the object, an aperture stop S, a double convex positive lens U21 having a stronger convex surface facing to the object, a cemented negative lens U22 constructed by a double convex positive lens U22P cemented with a double concave negative lens U22N, and a cemented positive lens U23 constructed by a negative meniscus lens U23N having a convex surface facing to the object cemented with a double convex positive lens U23P. The object side surface of the double convex positive lens U21 has an aspherical surface having a shape that the refractive power becomes weak as the height separates from the optical axis.

When the state of lens group positions varies from a wide-angle end state to a telephoto end state, the space between the first lens group G1 and the second lens group G2 decreases.

Moreover, the third lens group G3 composed of a positive meniscus lens having a convex, aspherical surface facing to the object is arranged to the image side of the second lens group G2. When the state of lens group positions varies from a wide-angle end state to a telephoto end state, the third lens group G3 is substantially fixed relative to the image plane.

All numerical examples including Example 1 have a low-pass filter P1 for cutting off a light having higher spatial frequency than the resolution limit of solid state imaging device such as a CCD arranged in the image plane and a cover glass P2 for protecting the imaging device.

Various values associated with Example 1 are listed in Table 1. In Table 1, f denotes the focal length of the zoom lens system, FNO denotes the f-number, and $\omega$ denotes a half of an angle of view (maximum angle of incidence) as a unit of degree [°]. In Lens Data, nd denotes refractive index at d-line ($\lambda$=587.6 nm), and $\nu$ denotes Abbe number. Refractive index of the air (n=1.00000) is abbreviated.

Aspherical surfaces are expressed by the following expression:

$$x=cy^2/\{1+(1-\kappa c^2y^2)^{1/2}\}+C4y^4+C6y^6+\ldots$$

where y denotes the height in a vertical direction relative to the optical axis, x denotes a sag amount, c denotes a reference radius of curvature, $\kappa$ denotes the conical coefficient, and C4, C6 ... denote aspherical coefficients.

In aspherical data, E–n denotes "$\times 10^{-n}$". For example, 1.234E–05 denotes $1.234\times10^{-5}$.

In the tables of the following numerical examples, the symbols and aspherical expression are the same as this example. In the table for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used.

TABLE 1

(Specifications)

| focal length | wide-angle end | intermediate | telephoto end |
|---|---|---|---|
| f | 7.40 | 12.50 | 21.30 |
| FNO | 2.8 | 3.5 | 4.7 |
| $\omega$ | 38.7 | 24.9 | 15.1 |

(Lens Data)

| surface number | radius of curvature | surface distance | nd | $\nu$ |
|---|---|---|---|---|
| 1 | 26.0783 | 1.500 | 1.74014 | 49.18 |
| 2 | 7.6961 | 5.800 | | |
| 3 | −155.8785 | 0.900 | 1.58913 | 61.18 |
| 4 | 31.7824 | 0.550 | | |
| 5 | 16.8801 | 2.200 | 1.80518 | 25.43 |
| 6 | 44.0584 | (D6) | | |
| 7 | ∞ | 1.900 | Aperture stop | |
| 8 | 8.8511 | 2.450 | 1.69350 | 53.22 |
| 9 | −166.6376 | 0.100 | | |
| 10 | 13.4713 | 2.300 | 1.71300 | 53.85 |
| 11 | −13.4713 | 0.900 | 1.80440 | 39.59 |
| 12 | 6.8062 | 0.800 | | |

TABLE 1-continued

| 13 | 22.1392 | 0.900 | 1.83400 | 37.17 |
|---|---|---|---|---|
| 14 | 6.5885 | 2.450 | 1.60311 | 60.68 |
| 15 | −34.6543 | (D15) | | |
| 16 | 17.0899 | 2.400 | 1.58313 | 59.62 |
| 17 | 46.4912 | 1.800 | | |
| 18 | ∞ | 2.760 | 1.45850 | 68.00 |
| 19 | ∞ | 1.441 | | |
| 20 | ∞ | 0.500 | 1.51680 | 64.20 |
| 21 | ∞ | (Bf) | | |

(Aspherical Data)
Surface Number 2

$\kappa = 0.1000$
$C4 = +1.27310E-04$
$C6 = +1.34320E-06$
$C8 = -7.35590E-09$
$C10 = +1.30540E-10$ Surface Number 8

$\kappa = 1.0000$
$C4 = -1.13270E-04$
$C6 = -1.12000E-06$
$C8 = +1.65790E-08$
$C10 = -7.00210E-10$ Surface Number 16

$\kappa = 1.0000$
$C4 = -2.52820E-05$
$C6 = +1.92860E-06$
$C8 = -4.85170E-08$
$C10 = +5.50360E-10$ (Variable intervals upon zooming)

| Position | wide-angle | intermediate | telephoto |
|---|---|---|---|
| f | 7.40 | 12.50 | 21.30 |
| D6 | 25.0716 | 11.2706 | 3.0000 |
| D15 | 6.7504 | 12.5982 | 22.6956 |
| Bf | 1.0272 | 1.0273 | 1.0196 |

(Values for the conditional expressions)

(1) $f2/|f22| = 1.024$
(2) $f23/|f22| = 2.98$
(3) $n23N - n23P = 0.2309$
(4) $\nu23P - \nu23N = 23.51$

Figure 2:
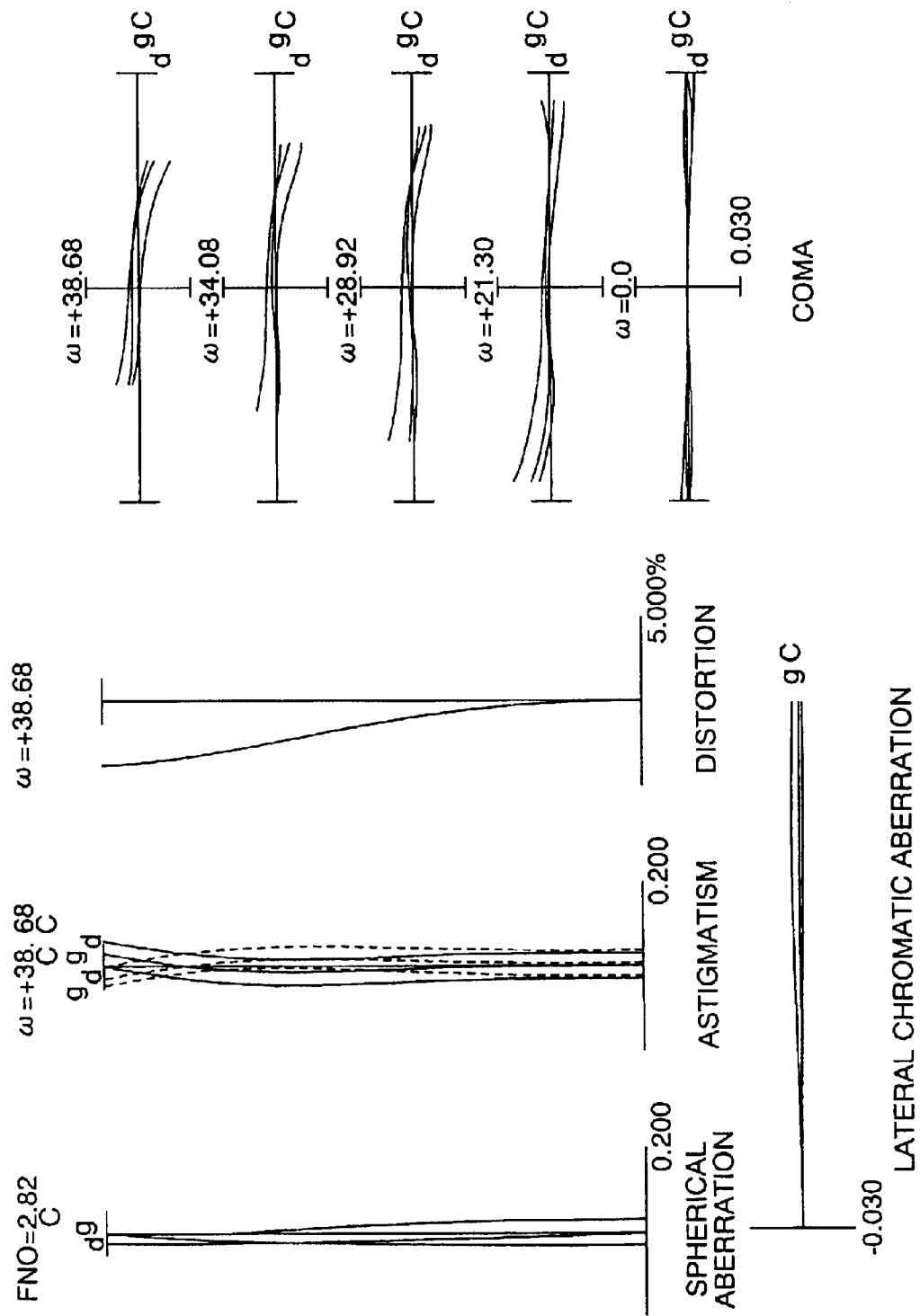
FIG. 2 graphically shows various aberrations of the zoom lens system according to Example 1 of the first embodiment in a wide-angle end state.
Figure 3:
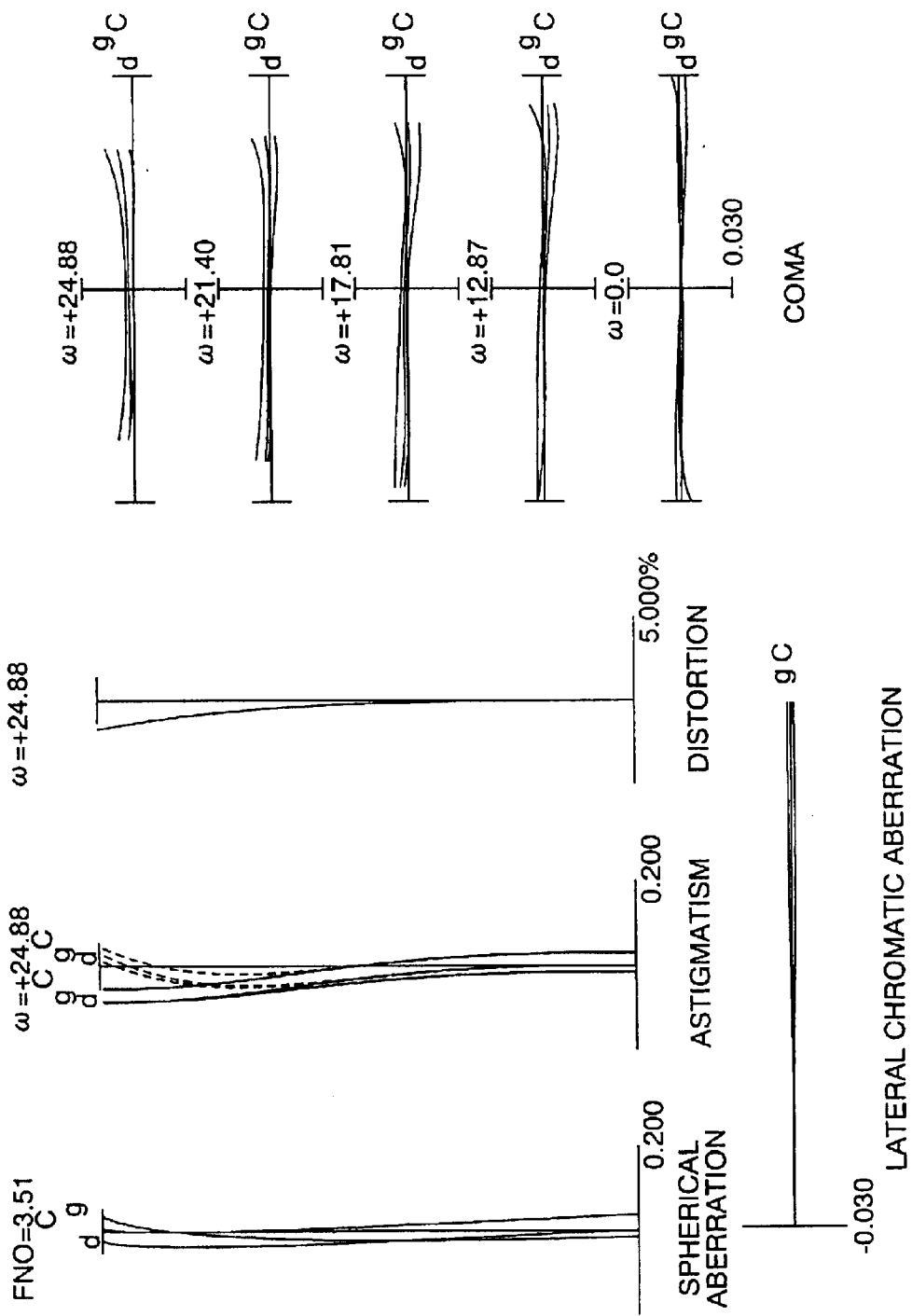
FIG. 3 graphically shows various aberrations of the zoom lens system according to Example 1 of the first embodiment in an intermediate focal length state.
Figure 4:
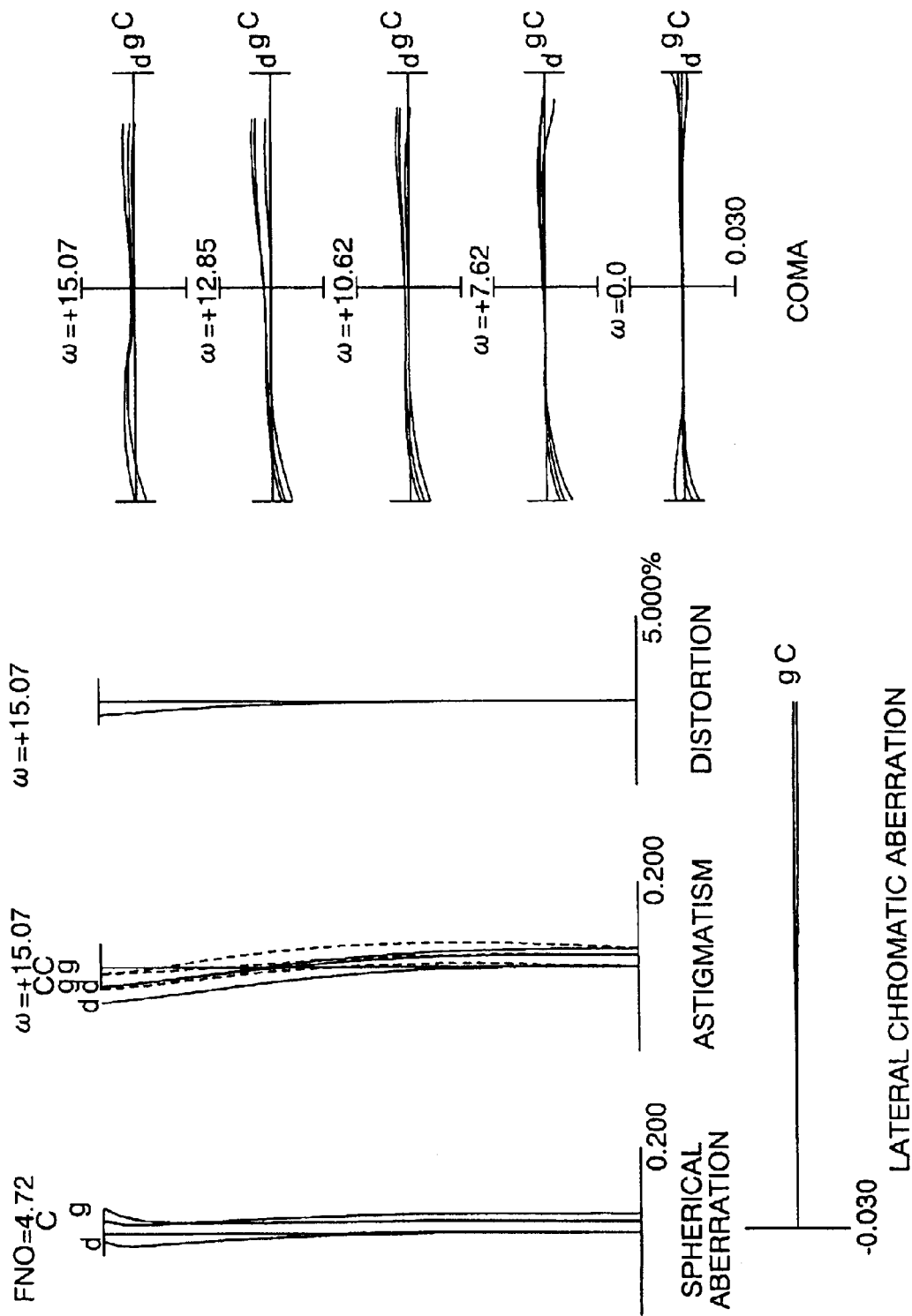
FIG. 4 graphically shows various aberrations of the zoom lens system according to Example 1 of the first embodiment in a telephoto end state.

FIGS. 2, 3, 4 graphically show various aberrations of the zoom lens system according to Example 1 of the first embodiment in the wide-angle end state, an intermediate focal length state, and the telephoto end state, respectively. In the graphs showing astigmatism, a solid line indicates a sagittal image plane, and a broken line indicates a meridional image plane. The reference symbol ω denotes a half of an angle of view (maximum angle of incidence) as a unit of degree [°]. In the graphs showing coma, the amount of coma is shown at each angle of incidence. In respective graphs, C denotes aberration amount at C-line ($\lambda=656.3$ nm), d denotes that at d-line ($\lambda=587.6$ nm), and g denote that at g-line ($\lambda=435.8$ nm). In all examples below, the same reference symbols as Example 1 are used.

As is apparent from the respective graphs showing various aberrations, excellent compensation is made for various aberrations, in particular for chromatic aberration to accomplish higher optical performance.

EXAMPLE 2

Figure 5:
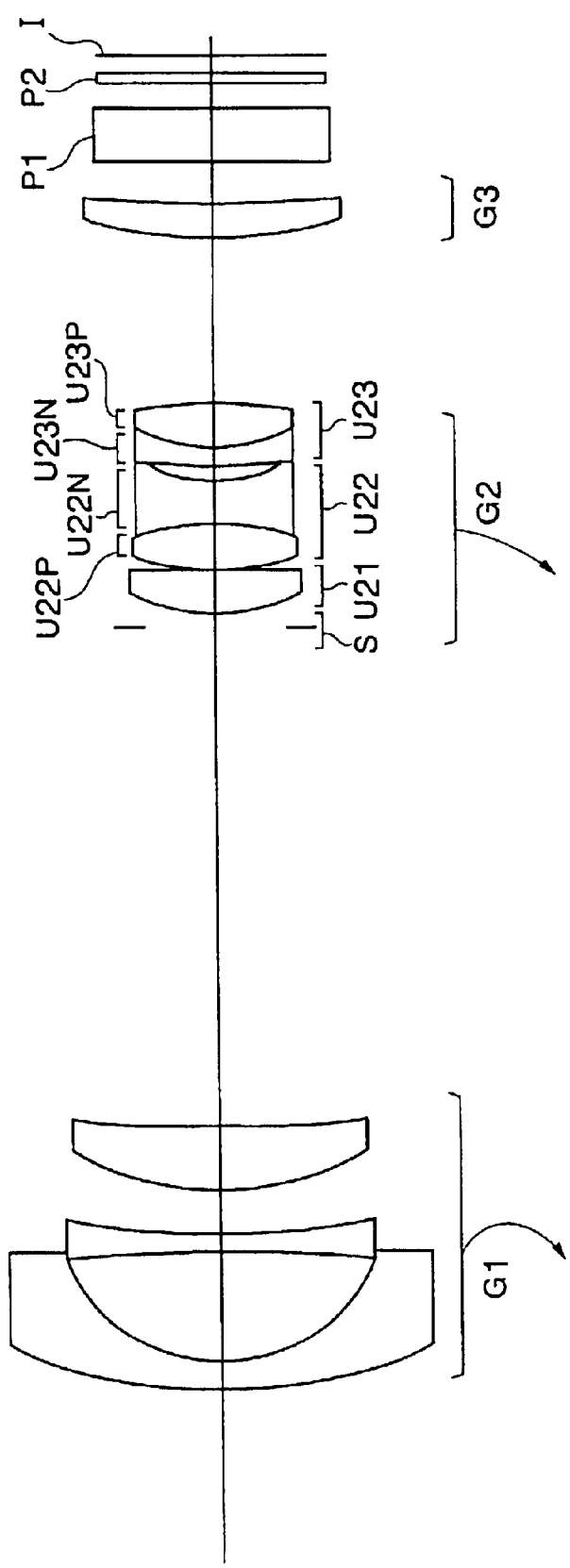
FIG. 5 is a sectional view showing the lens arrangement of a zoom lens system according to Example 2 of the first embodiment of the present invention.

FIG. 5 is a sectional view showing the lens arrangement of a zoom lens system according to Example 2 of the first embodiment of the present invention. The zoom lens system is composed of, in order from an object along an optical axis, a first lens group G1 having negative refractive power, a second lens group G2 having positive refractive power, and a third lens group G3 having positive refractive power.

The first lens group G1 is composed of, in order from the object, a negative meniscus lens having a convex surface facing to the object and an aspherical surface facing to an image, a double concave negative lens having a stronger concave surface facing to the image, and a positive meniscus lens having a convex surface facing to the object.

The second lens group G2 is composed of, in order from the object, an aperture stop S, a double convex positive lens U21 having a stronger convex surface facing to the object, a cemented negative lens U22 constructed by a double convex positive lens U22P cemented with a double concave negative lens U22N, and a cemented positive lens U23 constructed by a negative meniscus lens U23N having a convex surface facing to the object cemented with a double convex positive lens U23P. The object side surface of the double convex positive lens U21 has an aspherical surface having a shape that the refractive power becomes weak as the height separates from the optical axis.

When the state of lens group positions varies from a wide-angle end state to a telephoto end state, the space between the first lens group G1 and the second lens group G2 decreases.

Moreover, the third lens group G3 composed of a double convex positive lens having an aspherical surface facing to the object is arranged to the image side of the second lens group G2. When the state of lens group positions varies from a wide-angle end state to a telephoto end state, the third lens group G3 is substantially fixed relative to the image plane.

Various values associated with Example 2 are listed in Table 2.

TABLE 2

(Specifications)

| focal length | wide-angle end | intermediate | telephoto end |
|---|---|---|---|
| f | 7.40 | 12.43 | 21.30 |
| FNO | 2.9 | 3.7 | 5.0 |
| ω | 38.8 | 24.8 | 15.0 |

(Lens Data)

| surface number | radius of curvature | surface distance | nd | ν |
|---|---|---|---|---|
| 1 | 26.3278 | 1.700 | 1.74001 | 48.16 |
| 2 | 8.1533 | 5.750 | | |
| 3 | −174.3801 | 0.900 | 1.48749 | 70.24 |
| 4 | 23.4928 | 2.400 | | |
| 5 | 17.9444 | 3.200 | 1.84666 | 23.78 |
| 6 | 33.9654 | (D6) | | |
| 7 | ∞ | 0.500 | Aperture Stop | |
| 8 | 10.3019 | 2.550 | 1.66547 | 55.18 |
| 9 | −69.6160 | 0.100 | | |
| 10 | 14.8088 | 2.550 | 1.60562 | 43.73 |
| 11 | −14.8001 | 2.000 | 1.80100 | 34.96 |
| 12 | 7.8543 | 0.900 | | |
| 13 | 27.6364 | 0.900 | 1.80100 | 34.96 |
| 14 | 8.6622 | 2.700 | 1.61272 | 58.75 |
| 15 | −25.3313 | (D15) | | |
| 16 | 29.5916 | 2.300 | 1.66547 | 55.18 |
| 17 | −258.5473 | 1.922 | | |
| 18 | ∞ | 2.760 | 1.45850 | 68.00 |
| 19 | ∞ | 1.441 | | |
| 20 | ∞ | 0.500 | 1.51680 | 64.20 |
| 21 | ∞ | (Bf) | | |

TABLE 2-continued (Aspherical Data)
Surface Number 2

κ = 0.1000
C4 = +1.18060E-04
C6 = +7.93980E-07
C8 = -2.26350E-09
C10 = +7.95490E-11

Surface Number 8

κ = 1.0000
C4 = -6.65950E-05
C6 = -3.23530E-07
C8 = +3.34640E-09
C10 = -1.01760E-10

Surface Number 16

κ = 1.0000
C4 = -1.16570E-05
C6 = +1.10140E-06
C8 = -2.62900E-08
C10 = +2.73560E-10

(Variable intervals upon zooming)

| Position | wide-angle | intermediate | telephoto |
|---|---|---|---|
| f | 7.40 | 12.43 | 21.30 |
| D6 | 27.4238 | 13.4352 | 4.8711 |
| D15 | 8.5310 | 15.1680 | 26.8626 |
| Bf | 1.0300 | 1.0182 | 0.9880 |

(Values for the conditional expressions)

(1) f2/|f22| = 1.167
(2) f23/|f22| = 2.04
(3) n23N−n23P = 0.1883
(4) ν23P−ν23N = 23.79

Figure 6:
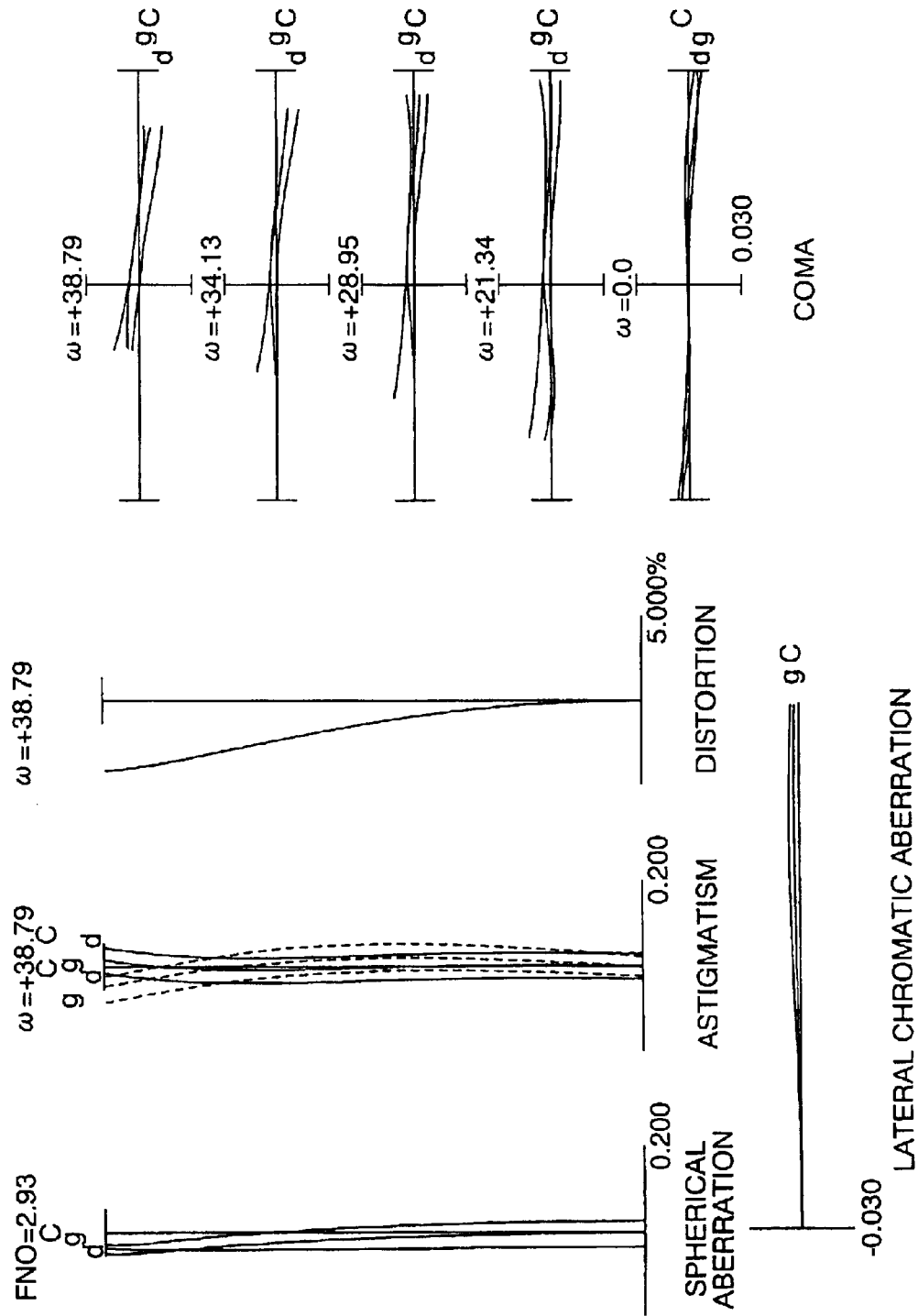
FIG. 6 graphically shows various aberrations of the zoom lens system according to Example 2 of the first embodiment in the wide-angle end state.
Figure 7:
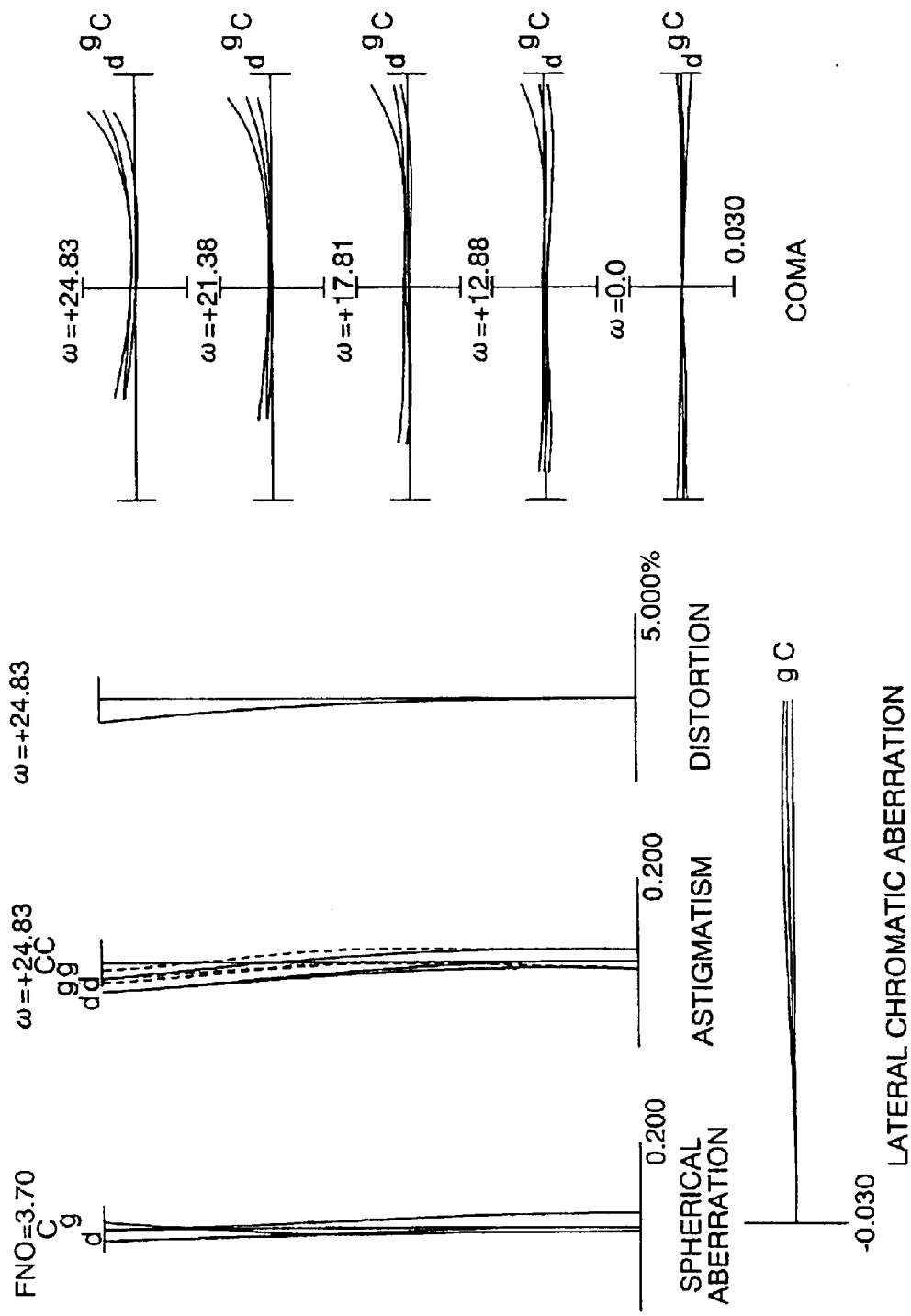
FIG. 7 graphically shows various aberrations of the zoom lens system according to Example 2 of the first embodiment in the intermediate focal length state.
Figure 8:
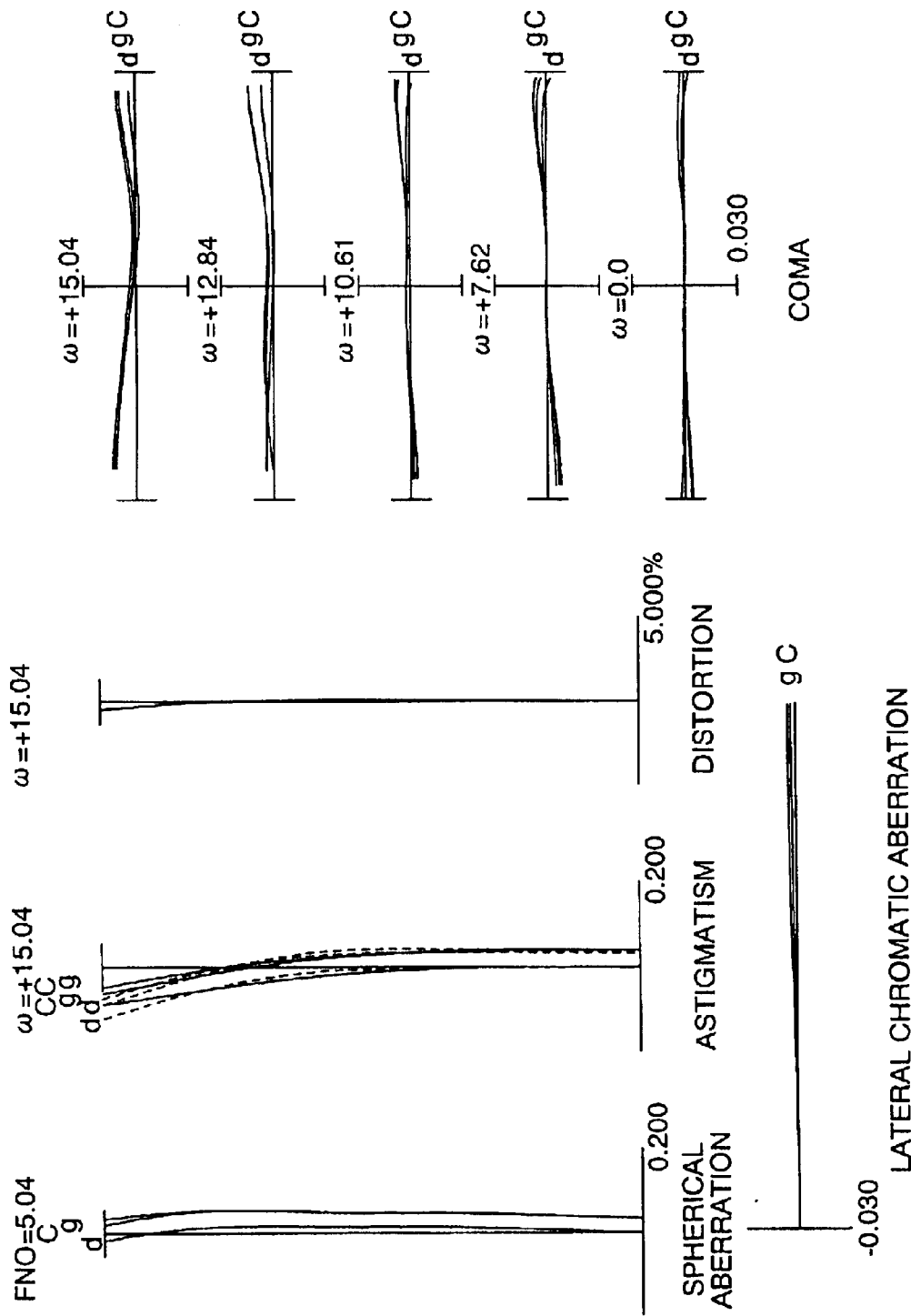
FIG. 8 graphically shows various aberrations of the zoom lens system according to Example 2 of the first embodiment in the telephoto end state.

FIGS. 6, 7, 8 graphically show various aberrations of the zoom lens system according to Example 2 of the first embodiment in the wide-angle end state, an intermediate focal length state, and the telephoto end state, respectively. As is apparent from the respective graphs showing various aberrations, excellent compensation is made for various aberrations, in particular for chromatic aberration to accomplish higher optical performance.

EXAMPLE 3

Figure 9:
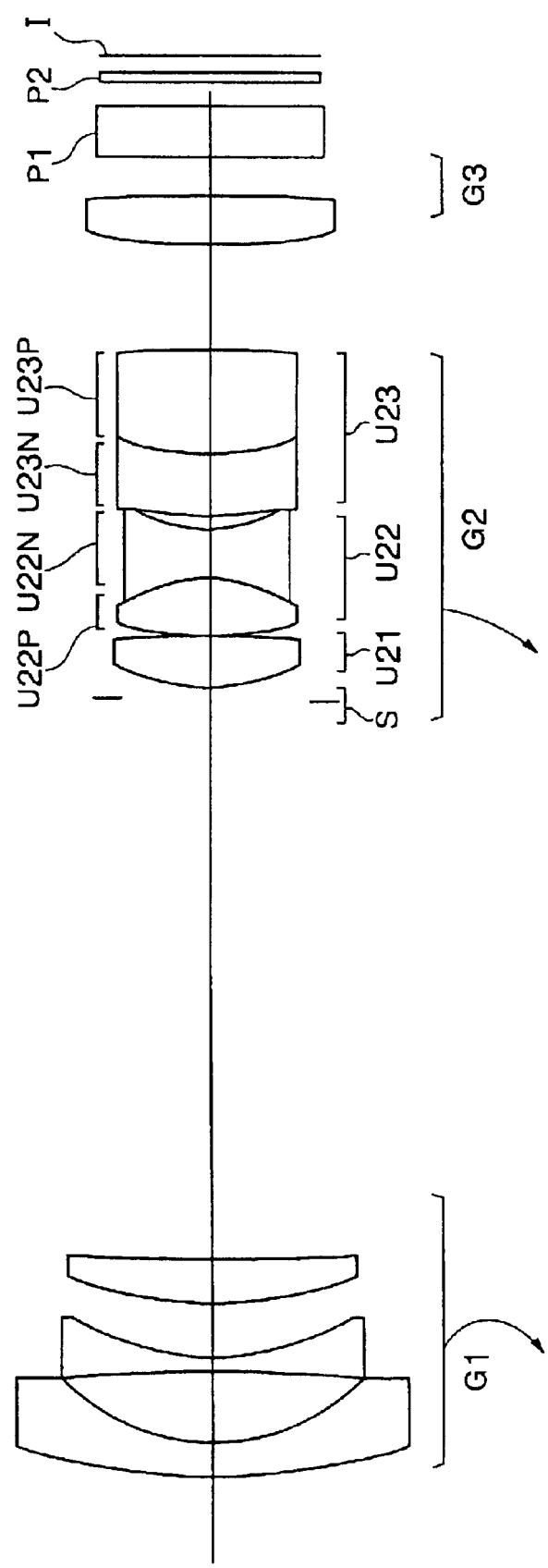
FIG. 9 is a sectional view showing the lens arrangement of a zoom lens system according to Example 3 of the first embodiment of the present invention.

FIG. 9 is a sectional view showing the lens arrangement of a zoom lens system according to Example 3 of the first embodiment of the present invention. The zoom lens system is composed of, in order from an object along an optical axis, a first lens group G1 having negative refractive power, a second lens group G2 having positive refractive power, and a third lens group G3 having positive refractive power.

The first lens group G1 is composed of, in order from the object, a negative meniscus lens having a convex surface facing to the object and an aspherical surface facing to an image, a double concave negative lens having a stronger concave surface facing to the image, and a positive meniscus lens having a convex surface facing to the object.

The second lens group G2 is composed of, in order from the object, an aperture stop S, a double convex positive lens U21 having a stronger convex surface facing to the object, a cemented negative lens U22 constructed by a double convex positive lens U22P cemented with a double concave negative lens U22N, and a cemented positive lens U23 constructed by a negative meniscus lens U23N having a convex surface facing to the object cemented with a double convex positive lens U23P. The object side surface of the double convex positive lens U21 has an aspherical surface having a shape that the refractive power becomes weak as the height separates from the optical axis.

When the state of lens group positions varies from a wide-angle end state to a telephoto end state, the space between the first lens group G1 and the second lens group G2 decreases.

Moreover, the third lens group G3 composed of a double convex positive lens having an aspherical surface facing to the object is arranged to the image side of the second lens group G2. When the state of lens group positions varies from a wide-angle end state to a telephoto end state, the third lens group G3 is substantially fixed relative to the image plane.

Various values associated with Example 3 are listed in Table 3.

TABLE 3

(Specifications)

| focal length | wide-angle end | intermediate | telephoto end |
|---|---|---|---|
| f | 10.00 | 17.00 | 28.70 |
| FNO | 2.9 | 3.7 | 5.0 |
| ω | 31.1 | 18.8 | 11.3 |

(Lens Data)

| surface number | radius of curvature | surface distance | nd | ν |
|---|---|---|---|---|
| 1 | 36.7383 | 1.800 | 1.620410 | 60.29 |
| 2 | 11.6827 | 3.900 | | |
| 3 | -210.7132 | 0.900 | 1.487490 | 70.24 |
| 4 | 14.5031 | 3.100 | | |
| 5 | 24.4594 | 2.500 | 1.686190 | 34.17 |
| 6 | 331.2016 | (D6) | | |
| 7 | ∞ | 0.500 | Aperture Stop | |
| 8 | 11.0922 | 2.850 | 1.665470 | 55.18 |
| 9 | -61.3936 | 0.100 | | |
| 10 | 23.1227 | 3.100 | 1.720000 | 43.69 |
| 11 | -10.2681 | 2.600 | 1.801000 | 34.96 |
| 12 | 7.9981 | 1.000 | | |
| 13 | 26.5196 | 3.500 | 1.846660 | 23.78 |
| 14 | 15.8829 | 5.700 | 1.670030 | 47.25 |
| 15 | -101.9984 | (D15) | | |
| 16 | 30.0000 | 2.800 | 1.665470 | 55.18 |
| 17 | -637.9762 | 2.314 | | |
| 18 | ∞ | 2.760 | 1.45850 | 68.00 |
| 19 | ∞ | 1.441 | | |
| 20 | ∞ | 0.500 | 1.51680 | 64.20 |
| 21 | ∞ | (Bf) | | |

(Aspherical Data)
Surface Number 2

κ = 6.4000
C4 = -5.94220E-06
C6 = -6.28170E-07
C8 = +9.76000E-09
C10 = -1.25630E-10

Surface Number 8

κ = 1.0000
C4 = -6.46070E-05
C6 = -1.23420E-07
C8 = -1.47870E-09
C10 = +9.18190E-12

Surface Number 16

κ = 1.0000
C4 = -1.62740E-05
C6 = +9.90660E-07
C8 = -2.33760E-08
C10 = +2.37190E-10

TABLE 3-continued (Variable intervals upon zooming)

| Position | wide-angle | intermediate | telephoto |
|---|---|---|---|
| f | 10.00 | 17.00 | 28.70 |
| D6 | 31.3570 | 14.3835 | 4.5000 |
| D15 | 5.8764 | 13.2722 | 25.6313 |
| Bf | 1.0271 | 1.0221 | 1.0102 |

(Values for the conditional expressions)

(1) f2/|f22| = 1.406
(2) f23/|f22| = 2.48
(3) n23N−n23P = 0.1766
(4) ν23P−ν23N = 23.47

Figure 10:
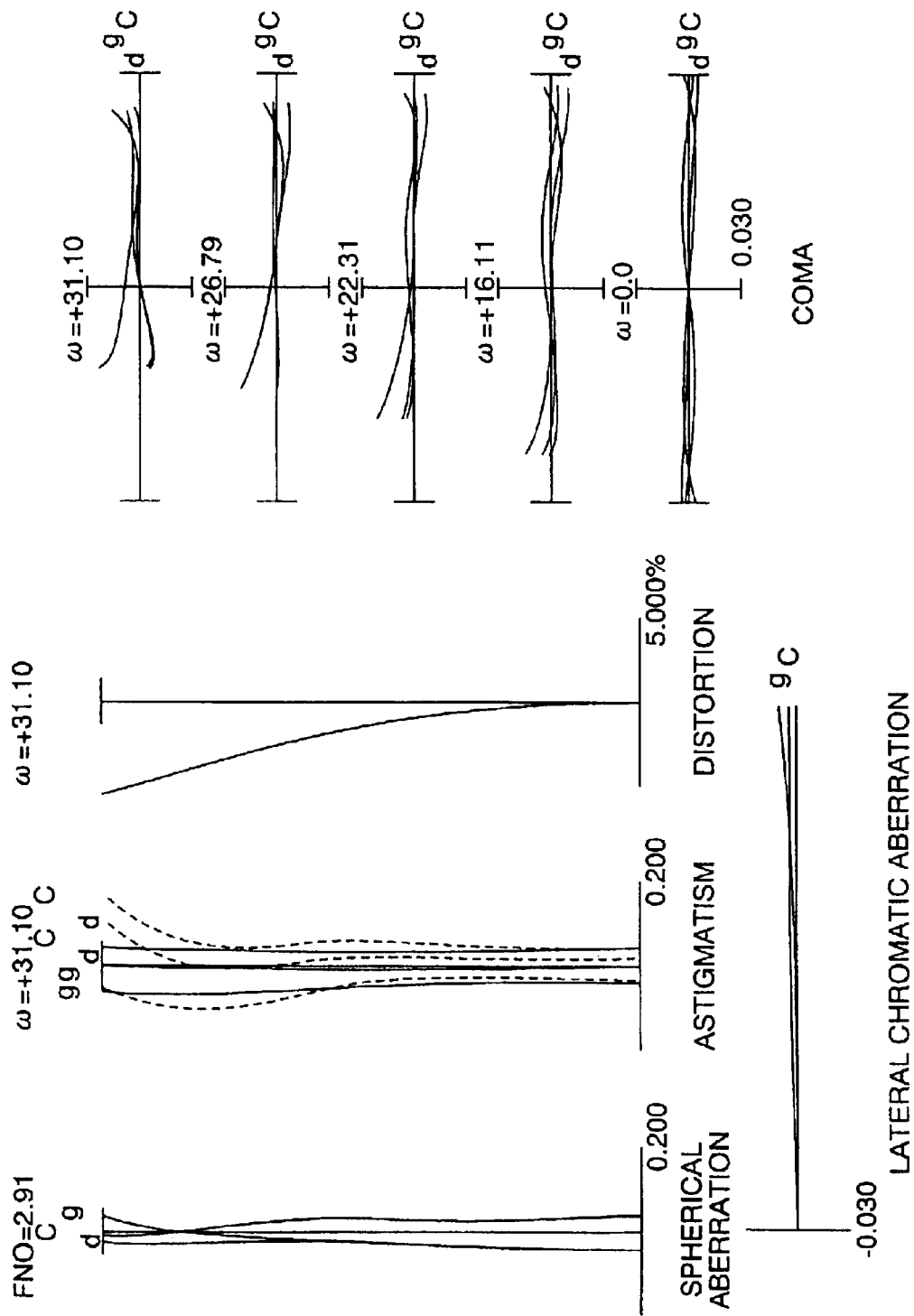
FIG. 10 graphically shows various aberrations of the zoom lens system according to Example 3 of the first embodiment in the wide-angle end state.
Figure 11:
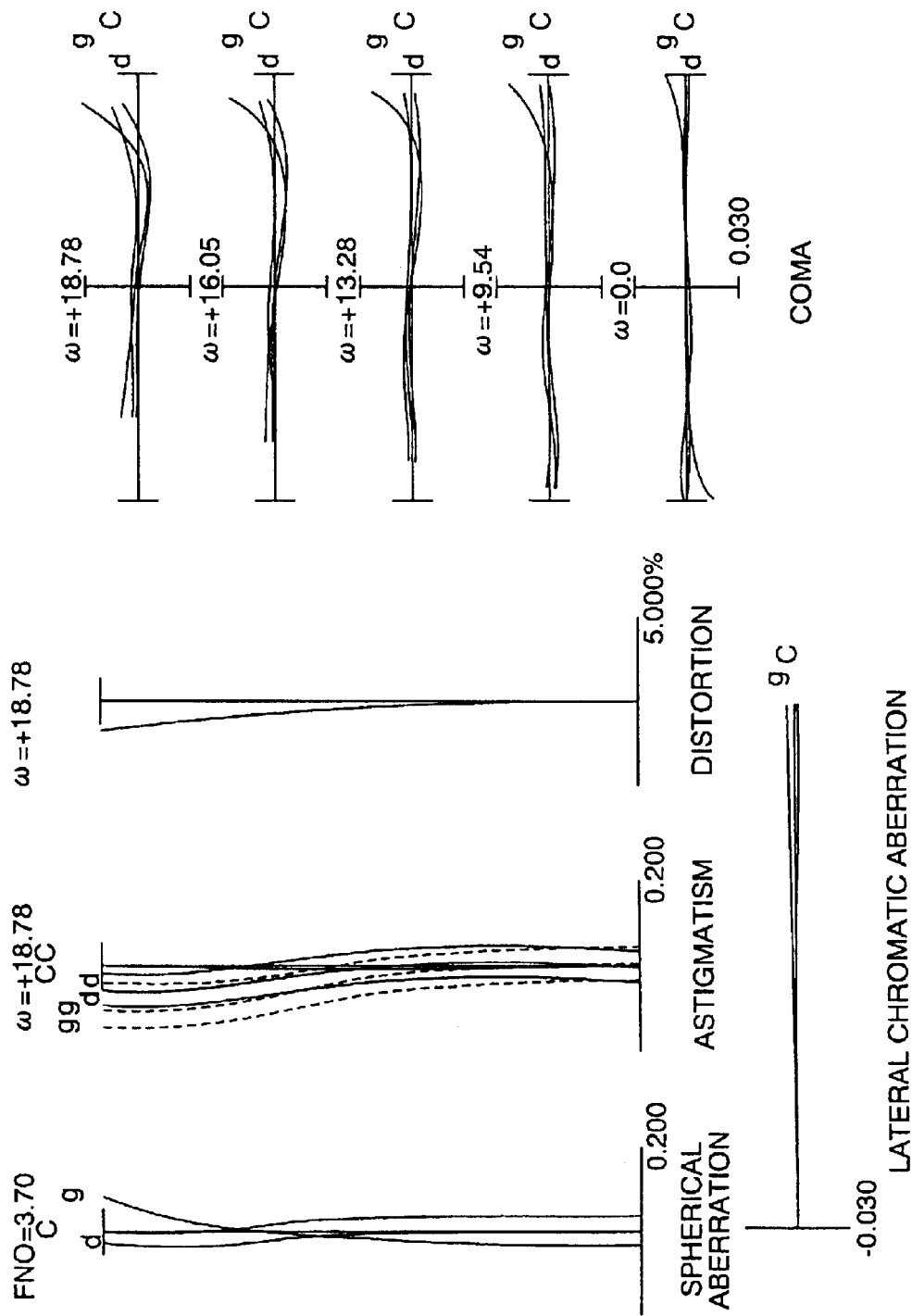
FIG. 11 graphically shows various aberrations of the zoom lens system according to Example 3 of the first embodiment in the intermediate focal length state.
Figure 12:
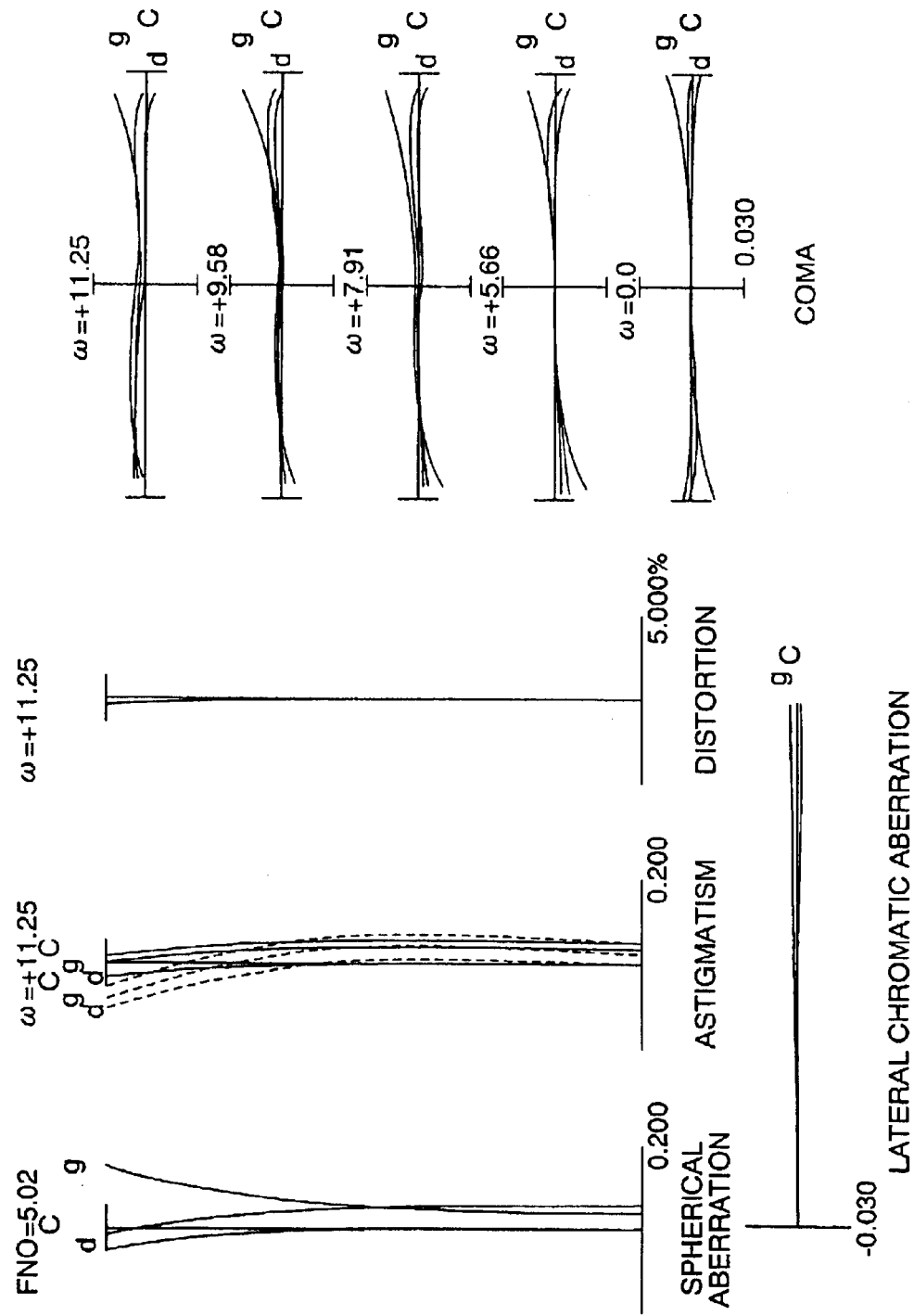
FIG. 12 graphically shows various aberrations of the zoom lens system according to Example 3 of the first embodiment in the telephoto end state.

FIGS. 10, 11, 12 graphically show various aberrations of the zoom lens system according to Example 3 of the first embodiment in the wide-angle end state, an intermediate focal length state, and the telephoto end state, respectively. As is apparent from the respective graphs showing various aberrations, excellent compensation is made for various aberrations, in particular for chromatic aberration to accomplish higher optical performance.

[Second Embodiment]

Then the reduction of flare component and chromatic aberration in the periphery of the image is explained. Among the aberration in off-axis ray (hereinafter called "off-axis aberration"), there is coma causing flare component. In order to reduce flare component caused by coma, it can be considered to cut off periphery of a bundle of the off-axis rays (off-axis bundle of rays) by means of a stop or the like.

Among the off-axis aberration, there are chromatic coma and lateral chromatic aberration causing chromatic aberration. In particular, chromatic coma seriously affects chromatic aberration. In order to reduce chromatic aberration caused by chromatic coma, it can be considered to cut off periphery of the off-axis bundle of rays by means of a stop or the like, just the same way as to reduce flare component.

Therefore, in order to reduce chromatic aberration caused by flare component and chromatic coma, the second embodiment of the present invention has a fixed stop FS having a fixed diameter of a stop arranged between the first lens group G1 and the second lens group G2.

By using the construction to cut off a portion of periphery of the off-axis bundle of rays, the second embodiment of the present invention makes it possible to reduce flare component and chromatic aberration in the periphery of the image.

Then the way to effectively reduce flare component and chromatic aberration in the periphery of the image is explained. In the wide-angle end state W, off-axis ray incident to the first lens group G1 separates severely from the optical axis more than the diameter of the off-axis bundle of rays as the angle of incidence increases. In the mean time, in the telephoto end state T, off-axis ray does not separate from the optical axis more than the diameter of the off-axis bundle of rays as the angle of incidence increases. In an intermediate focal length state, incident ray takes an intermediate state between the wide-angle end state W and the telephoto end state T.

On the other hand, off-axis ray incident to the second lens group G2 does not separate from the optical axis more than the diameter of the off-axis bundle of rays in all over the range of the focal length from the wide-angle end state W to the telephoto end state T.

As described above, it is assumed that the zoom lens system has a fixed stop FS locating in the vicinity of the first lens group G1 in the wide-angle end state W and the fixed stop FS moves with the first lens group G1 in a body when the state of lens group positions varies in the vicinity of the wide-angle end state W. In this case, when the angle of incidence of the off-axis ray is smaller than a certain value, the fixed stop FS does not show the effect of cutting off the flare component or reducing chromatic aberration caused by chromatic coma on the off-axis ray. When the angle of incidence of the off-axis ray exceeds the certain value, the above-described effect appears suddenly. When the angle of incidence of the off-axis ray becomes maximum, the fixed stop FS exhibits excessive effect, so that the drop in brightness in the periphery becomes too much. Therefore, the effect of the fixed stop FS cannot be obtained appropriately in all over the image. Moreover, since the drop in brightness in the periphery becomes excessive at the maximum angle of incidence of the off-axis ray, the purpose of the present invention to obtain higher optical performance in all over the image cannot be accomplished.

Accordingly, in the second embodiment of the present invention, the fixed stop FS is located at a position having a proper distance to the first lens group G1 in the wide-angle end state W. When the state of lens group positions varies from the wide-angle end state W to an intermediate focal length state, the fixed stop FS moves with the second lens group G2 in a body and the distance between the first lens group G1 and the fixed stop FS decreases.

Thus the effect of the fixed stop FS for cutting off the flare component and reducing chromatic aberration caused by chromatic coma can be obtained from relatively small angle of incidence. Moreover, higher optical performance can be obtained in all over the image without causing excessive drop in brightness in the periphery at the maximum angle of incidence of the off-axis ray.

In the vicinity of the telephoto end state T, by using the above-described off-axis ray relation that when the angle of incidence becomes large, the off-axis ray does not separate from the optical axis more than the diameter of the off-axis bundle of rays in the vicinity of the first lens group G1 and the second lens group G2, the almost same effect can be obtained by placing the fixed stop FS in the vicinity of either the first lens group G1 and the second lens group G2.

However, if the lens system has the construction that the fixed stop FS moves with the second lens group G2 in a body and the distance between the first lens group G1 and the fixed stop FS decreases when the state of lens group positions varies from the wide-angle end state W to the telephoto end state T, then the fixed stop FS collides with the first lens group G1 at a certain intermediate focal length state. An appropriate focal length state before collision is assumed to be a certain intermediate focal length state M. In order to simplify the construction effective to be compact, which is the purpose of the present invention, it is preferable that the fixed stop FS moves with the first lens group G1 in a body and the distance between the fixed stop FS and the second lens group G2 decreases when the state of lens group positions varies from the certain intermediate focal length state M to the telephoto end state T.

To summarize above, when the state of lens group positions varies from the wide-angle end state W to the certain intermediate focal length state M, it is preferable that the fixed stop FS moves with the second lens group G2 in a body and the distance between the fixed stop FS and the first lens group G1 decreases. When the state of lens group positions varies from the certain intermediate focal length state M to the telephoto end state T, it is preferable that the fixed stop FS moves with the first lens group G1 in a body and the distance between the fixed stop FS and the second lens group G2 decreases.

In the present invention, the second lens group G2 has an aperture stop S and the following conditional expressions (5), (6), (7), and (8) are preferably satisfied;

$$0.80 < fM/(fW \cdot fT)^{1/2} < 1.30 \qquad (5)$$

$$0.25 < D2W/(D1W+D2W) < 0.65 \qquad (6)$$

$$\phi FS \cdot FNOT/fT > 1.40 \qquad (7)$$

$$\phi FS/\phi ST < 1.20 \qquad (8)$$

where fW denotes the focal length of the zoom lens system in the wide-angle end state W, fM denotes the focal length of the certain intermediate focal length state M, fT denotes the focal length of the zoom lens system in the telephoto end state T, D1W denotes the distance between the most image side surface of the first lens group G1 and the fixed stop FS in the wide-angle end state W, D2W denotes the distance between the fixed stop FS and the most object side surface of the second lens group G2 in the wide-angle end state W, FNOT denotes f-number of the zoom lens system in the telephoto end state T, $\phi$FS denotes the diameter of the fixed stop FS, and $\phi$ST denotes the maximum diameter of the aperture stop S in the telephoto end state T.

Conditional expression (5) defines an appropriate range of the certain intermediate focal length state M. When the ratio fM/(fW·fT)$^{1/2}$ exceeds the upper limit of conditional expression (5), the range of focal length where the fixed stop FS moves with the second lens group G2 in a body becomes from the wide-angle end state W to the vicinity of the telephoto end state T. Accordingly, it is necessary to happen that the fixed stop FS is located excessively close to the second lens group G2 in the wide-angle end state W in order not to collide the fixed stop FS with the first lens group G1. Since the bundle of on-axis rays (on-axis bundle of rays) is limited by the aperture stop S for defining f-number, the bundle of rays cannot be limited by the fixed stop FS.

In the vicinity of the second lens group G2, since the on-axis bundle of rays and the off-axis bundle of rays do not separate much, when the fixed stop FS is located excessively close to the second lens group G2, the fixed stop FS cannot effectively cut off only periphery of the off-axis bundle of rays without cutting off the on-axis bundle of rays. Accordingly, the effect of cutting off the flare component in the periphery of the image and reducing chromatic aberration caused by chromatic coma cannot be obtained. Therefore, the purpose of the present invention to obtain higher optical performance in all over the image cannot be accomplished.

On the other hand, when the ratio falls below the lower limit of conditional expression (5), the range of the focal length where the fixed stop FS moves with the first lens group G1 in a body becomes so wide extending from the vicinity of the wide-angle end state W to the telephoto end state T. Accordingly, the fixed stop FS is located excessively closed to the first lens group G1 in the wide-angle end state W. Moreover, in the wide-angle end state W, when the angle of incidence of the off-axis ray is smaller than a certain value, the fixed stop FS does not show the effect of cutting off the flare component or reducing chromatic aberration caused by chromatic coma on the off-axis ray. When the angle of incidence of the off-axis ray exceeds the certain value, the above-described effect appears suddenly. When the angle of incidence of the off-axis ray becomes maximum, the fixed stop FS exhibits excessive effect, so that the drop in brightness in the periphery becomes too much. Therefore, the effect of the fixed stop FS cannot be obtained appropriately in all over the image. Moreover, since the drop in brightness in the periphery becomes excessive at the maximum angle of incidence of the off-axis ray, the purpose of the present invention to obtain higher optical performance in all over the image cannot be accomplished.

Conditional expression (6) defines an appropriate range of the position where the fixed stop FS locates in the wide-angle end state W. When the ratio D2W/(D1W+D2W) exceeds the upper limit of conditional expression (6), the range of the focal length where the fixed stop FS moves with the first lens group G1 in a body becomes so wide extending from the vicinity of the wide-angle end state W to the telephoto end state T. As same as the explanation regarding conditional expression (5), the fixed stop FS is located excessively closed to the first lens group G1 in the wide-angle end state W. Moreover, in the wide-angle end state W, when the angle of incidence of the off-axis ray is smaller than a certain value, the fixed stop FS does not show the effect of cutting off the flare component or reducing chromatic aberration caused by chromatic coma on the off-axis ray. When the angle of incidence of the off-axis ray exceeds the certain value, the above-described effect appears suddenly. When the angle of incidence of the off-axis ray becomes maximum, the fixed stop FS exhibits excessive effect, so that the drop in brightness in the periphery becomes too much. Therefore, the effect of the fixed stop FS cannot be obtained appropriately in all over the image. Moreover, since the drop in brightness in the periphery becomes excessive at the maximum angle of incidence of the off-axis ray, the purpose of the present invention to obtain higher optical performance in all over the image cannot be accomplished.

On the other hand, when the ratio falls below the lower limit of conditional expression (6), the range of focal length where the fixed stop FS moves with the second lens group G2 in a body becomes from the wide-angle end state W to the vicinity of the telephoto end state T. As same as the explanation regarding conditional expression (5), it is necessary to happen that the fixed stop FS is located excessively close to the second lens group G2 in the wide-angle end state W in order that the fixed stop FS may not collide with the first lens group G1. Since the on-axis bundle of rays is limited by the aperture stop S for defining f-number, the bundle of rays cannot be limited by the fixed stop FS.

In the vicinity of the second lens group G2, since the on-axis bundle of rays and the off-axis bundle of rays do not separate much, when the fixed stop FS is located excessively close to the second lens group G2, the fixed stop FS cannot effectively cut off only periphery of the off-axis bundle of rays without cutting off the on-axis bundle of rays. Accordingly, the effect of cutting off the flare component in the periphery of the image and reducing chromatic aberration caused by chromatic coma cannot be obtained. Therefore, the purpose of the present invention to obtain higher optical performance in all over the image cannot be accomplished.

Conditional expression (7) defines an appropriate range, the lower limit, of the diameter of the fixed stop FS. When the value $\phi$FS·FNOT/fT falls below the lower limit of conditional expression (7), the fixed stop FS excessively cuts off the off-axis bundle of rays under the conditional expressions (5) and (6), so that the drop in the brightness in the periphery becomes too much. Therefore, the purpose of the present invention to obtain higher optical performance in all over the image cannot be accomplished.

Conditional expression (8) defines an appropriate range, the upper limit, of the diameter of the fixed stop FS. When the value $\phi$FS/$\phi$ST exceeds the upper limit of conditional expression (8), the fixed stop FS cannot sufficiently cut off the off-axis bundle of rays under the conditional expressions (5) and (6). Accordingly, the effect of cutting off the flare component in the periphery and reducing chromatic aberration caused by chromatic coma cannot sufficiently be obtained. Therefore, the purpose of the present invention to obtain higher optical performance in all over the image cannot be accomplished.

Moreover, it is preferable that the present invention has a third lens group G3 having positive refractive power being located to the image side of the second lens group G2 and that the third lens group G3 is substantially fixed relative to the image plane when the state of lens group positions varies from the wide-angle end state W to the telephoto end state T.

Therefore, the exit pupil can be located farther away from the image plane. Accordingly, the characteristic to the solid-state imaging device can be improved, which results in obtaining higher optical performance.

It is possible for the zoom lens system according to the present invention to move the image in the image plane by moving a portion or all of lens groups to the direction perpendicular to the optical axis. By using this effect, the zoom lens system according to the present invention can be used for a so-called anti-vibration lens.

EXAMPLE 4

Figure 13:
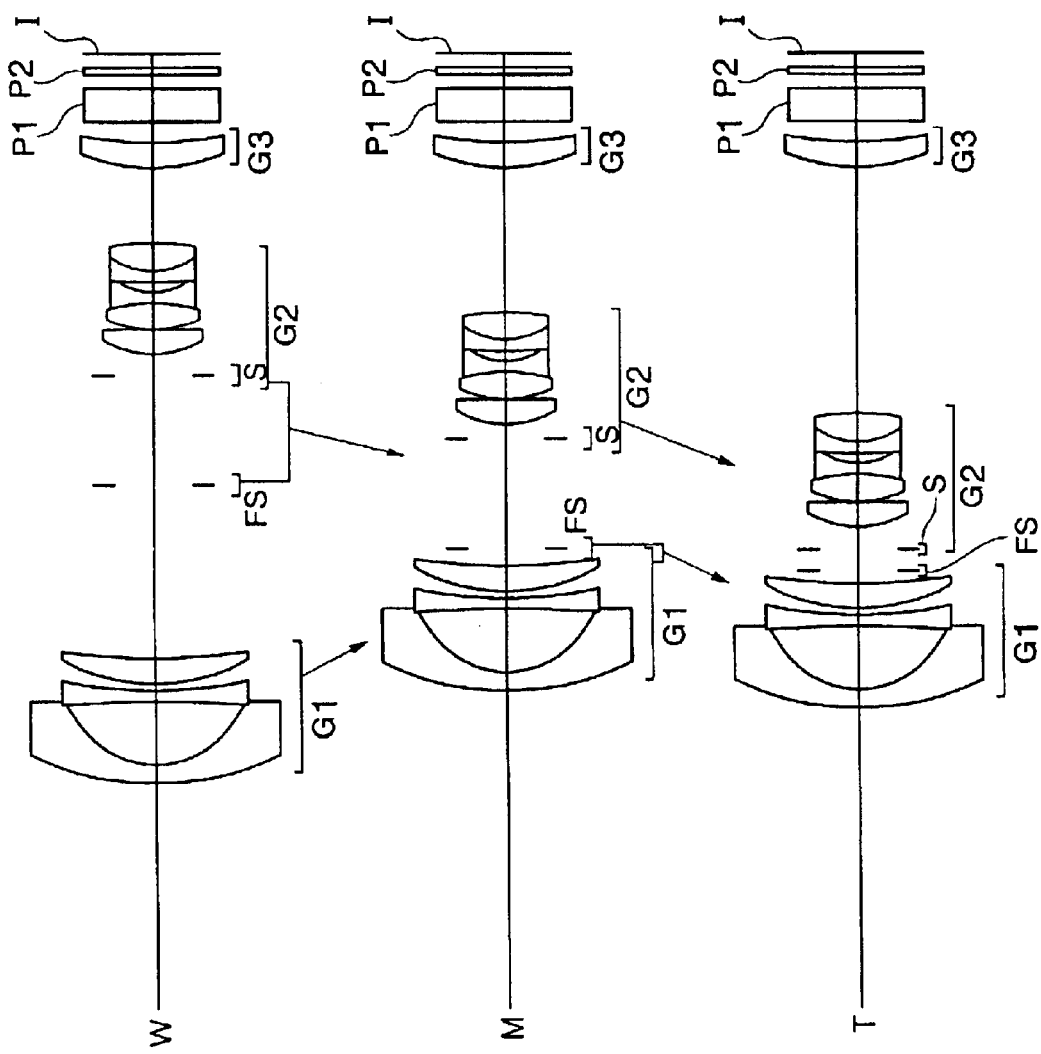
FIG. 13 is a sectional view showing the lens arrangement of a zoom lens system according to Example 4 of a second embodiment of the present invention, together with the movement of each lens group when the state of lens group positions varies from the wide-angle end state W to the telephoto end state T through a certain intermediate focal length state M.

FIG. 13 is a sectional view showing the lens arrangement of a zoom lens system according to Example 4 of the second embodiment of the present invention, together with the movement of each lens group when the state of lens group positions varies from the wide-angle end state W to the telephoto end state T through a certain intermediate focal length state M.

The zoom lens system is composed of, in order from the object along an optical axis, a first lens group G1 having negative refractive power, a fixed stop FS, a second lens group G2 having positive refractive power, and a third lens group G3 having positive refractive power.

The first lens group G1 is composed of, in order from the object, a negative meniscus lens having a convex surface facing to the object and an aspherical surface facing to the image, a double concave negative lens having a stronger concave surface facing to the image, and a positive meniscus lens having a convex surface facing to the object.

The second lens group G2 is composed of, in order from the object, an aperture stop S, a double convex positive lens having a stronger convex, aspherical surface facing to the object, a negative cemented lens constructed by a double convex positive lens cemented with a double concave negative lens, and a positive cemented lens constructed by a negative meniscus lens having a convex surface facing to the object cemented with a double convex positive lens.

The third lens group G3 is composed of, in order from the object, a positive meniscus lens having a convex, aspherical surface facing to the object.

When the state of lens group positions varies from the wide-angle end state W to the telephoto end state T, the distance between the first lens group G1 and the second lens group G2 decreases.

When the state of lens group positions varies from the wide-angle end state W to a certain intermediate focal length state M, the distance between the first lens group G1 and the fixed stop FS decreases as the fixed stop FS is moved with the second lens group G2 in a body.

When the state of lens group positions varies from the certain intermediate focal length state M to the telephoto end state T, the distance between the fixed stop FS and the second lens group G2 decreases as the fixed stop FS moves with the first lens group G1 in a body.

Moreover, the third lens group G3 is substantially fixed relative to the image plane when the state of lens group positions varies from the wide-angle end state W to the telephoto end state T.

All numerical examples have a low-pass filter P1 for cutting off a light having higher spatial frequency than the resolution limit of solid state imaging device such as a CCD arranged in the image plane I and a cover glass P2 for protecting the imaging device.

Various values associated with Example 4 are listed in Table 4.

TABLE 4

(Specifications)

| focal length | W | M | T |
|---|---|---|---|
| f | 7.40 | 13.00 | 21.30 |
| FNO | 2.8 | 3.6 | 4.7 |
| ω | 38.7 | 24.0 | 15.1 |

(Lens Data)

| surface number | radius of curvature | surface distance | nd | ν |
|---|---|---|---|---|
| 1 | 26.0783 | 1.500 | 1.74014 | 49.18 |
| 2 | 7.6961 | 5.800 | | |
| 3 | −155.8785 | 0.900 | 1.58913 | 61.18 |
| 4 | 31.7824 | 0.550 | | |
| 5 | 16.8801 | 2.200 | 1.80518 | 25.43 |
| 6 | 44.0584 | (D6) | | |
| 7 | ∞ | (D7) | Fixed Stop FS | |
| 8 | ∞ | 1.900 | Aperture Stop S | |
| 9 | 8.8511 | 2.450 | 1.69350 | 53.22 |
| 10 | −166.6376 | 0.100 | | |
| 11 | 13.4713 | 2.300 | 1.71300 | 53.85 |
| 12 | −13.4713 | 0.900 | 1.80440 | 39.59 |
| 13 | 6.8062 | 0.800 | | |
| 14 | 22.1392 | 0.900 | 1.83400 | 37.17 |
| 15 | 6.5885 | 2.450 | 1.60311 | 60.68 |
| 16 | −34.6543 | (D16) | | |
| 17 | 17.0899 | 2.400 | 1.58313 | 59.62 |
| 18 | 46.4912 | 1.800 | | |
| 19 | ∞ | 2.760 | 1.45850 | 68.00 |
| 20 | ∞ | 1.441 | | |
| 21 | ∞ | 0.500 | 1.51680 | 64.20 |
| 22 | ∞ | (Bf) | | |

(Aspherical Data)

Surface Number 2

κ = 0.1000
C4 = +1.27310E-04
C6 = +1.34320E-06
C8 = −7.35590E-09
C10 = +1.30540E-10

Surface Number 9

κ = 1.0000
C4 = −1.13270E-04
C6 = −1.12000E-06
C8 = +1.65790E-08
C10 = −7.00210E-10

Surface Number 17

κ = 1.0000
C4 = −2.52820E-05
C6 = +1.92860E-06
C8 = −4.85170E-08
C10 = +5.50360E-10

TABLE 4-continued (Variable intervals upon zooming)

| focal length | W | M | T |
|---|---|---|---|
| f | 7.40 | 13.00 | 21.30 |
| D6 | 15.5716 | 1.0000 | 1.0000 |
| D7 | 9.5000 | 9.5000 | 2.0000 |
| D16 | 6.7504 | 13.1730 | 22.6956 |
| Bf | 1.0272 | 1.0266 | 1.0196 |

Figure 14:
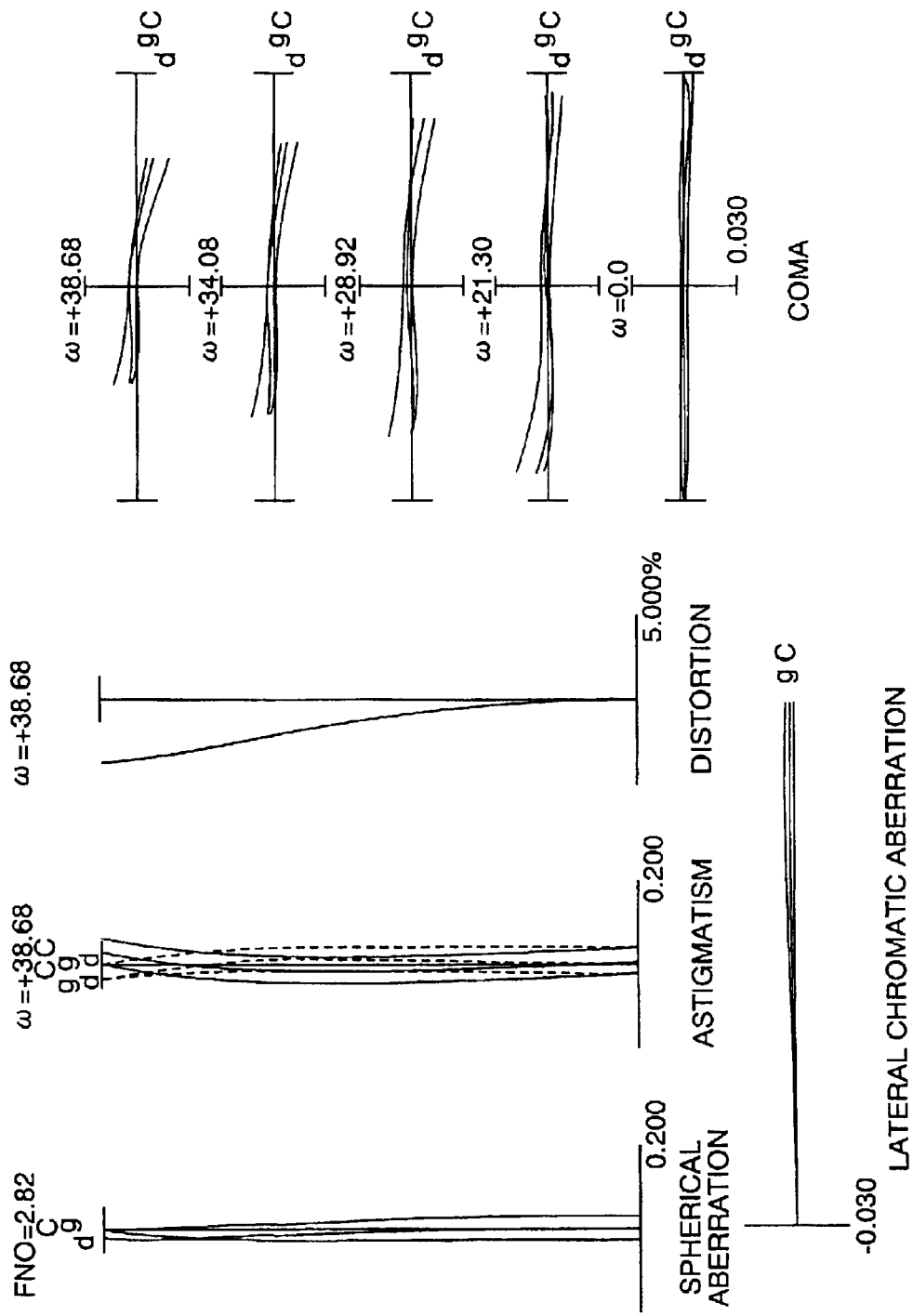
FIG. 14 graphically shows various aberrations of the zoom lens system according to Example 4 of the second embodiment in the wide-angle end state W.
Figure 15:
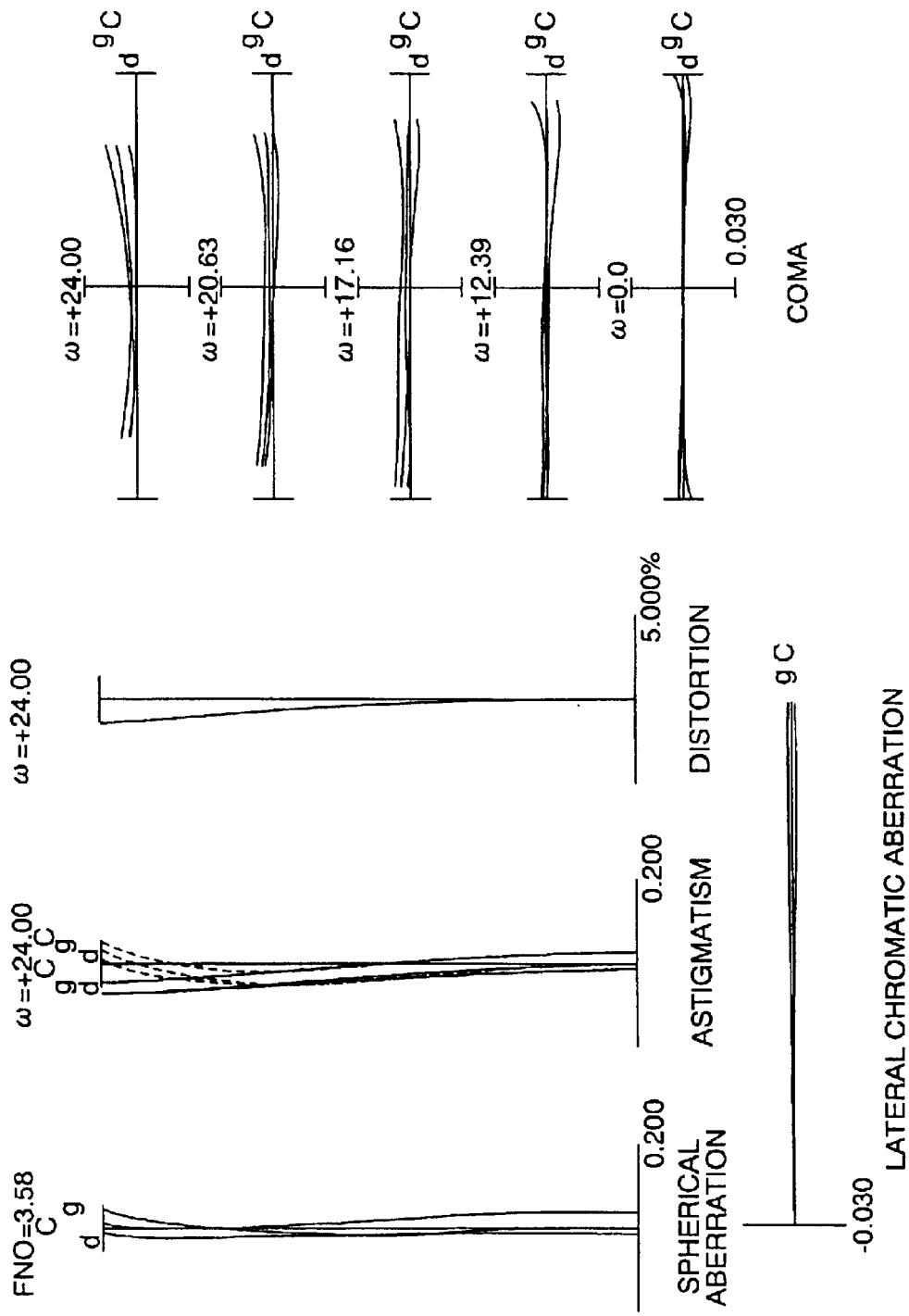
FIG. 15 graphically shows various aberrations of the zoom lens system according to Example 4 of the second embodiment in the certain intermediate focal length state M.
Figure 16:
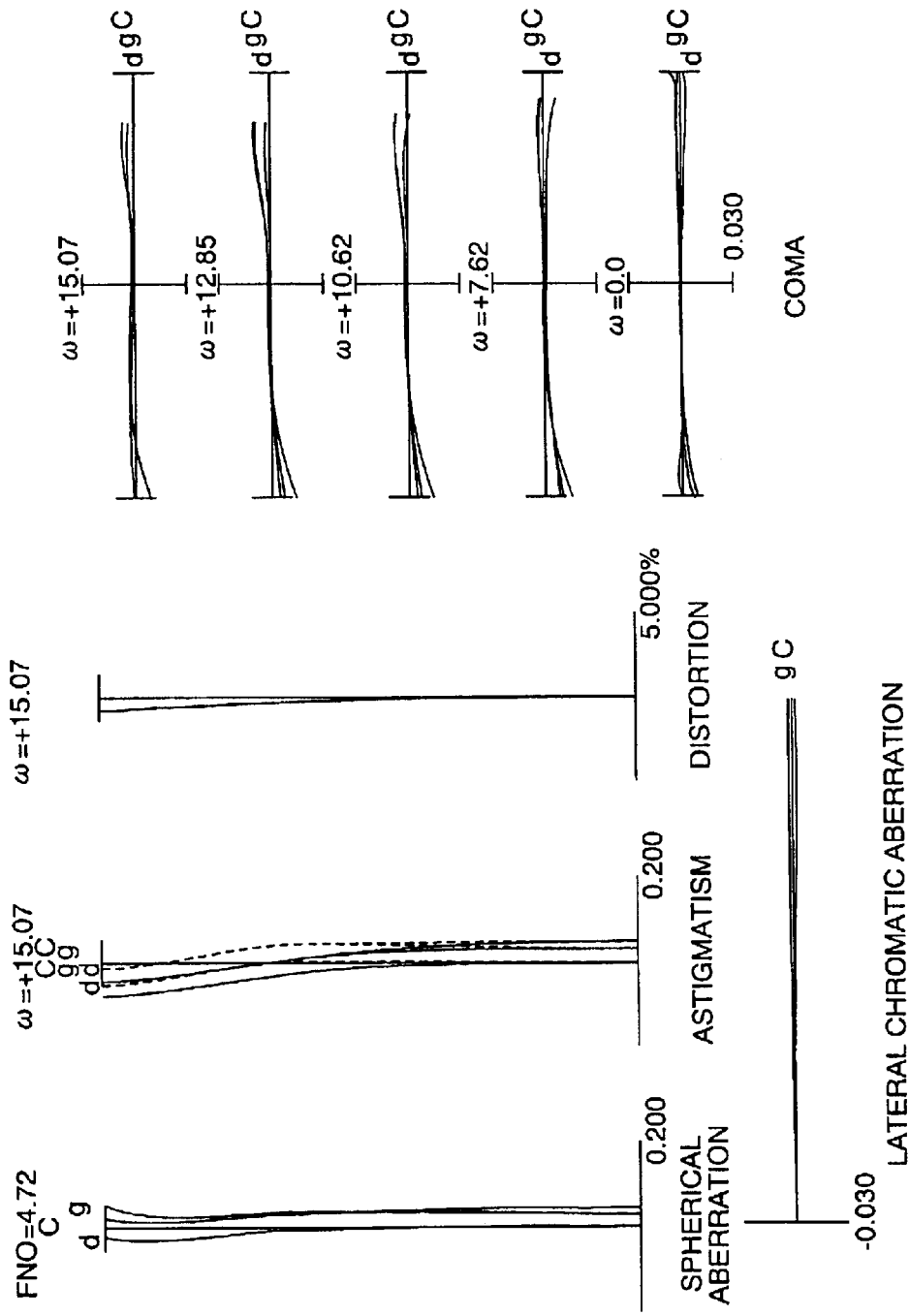
FIG. 16 graphically shows various aberrations of the zoom lens system according to Example 4 of the second embodiment in the telephoto end state T.

(Values for the conditional expressions)

fW = 7.40
fM = 13.00
fT = 21.30
D1W = 15.5716
D2W = 11.4000
FNOT = 4.7
ΦFS = 8.20
ΦST = 7.50
(5) $fM/(fW \cdot fT)^{1/2} = 1.04$
(6) $D2W/(D1W + D2W) = 0.42$
(7) $\Phi FS \cdot FNOT/fT = 1.81$
(8) $\Phi FS/\Phi ST = 1.09$ FIGS. 14, 15, 16 graphically show various aberrations of the zoom lens system according to Example 4 of the second embodiment in the wide-angle end state W, the certain intermediate focal length state M, and the telephoto end state T, respectively. As is apparent from the respective graphs showing various aberrations, excellent compensation is made for various aberrations, in particular for flare component in the periphery and for chromatic aberration caused by chromatic coma to accomplish higher optical performance.

EXAMPLE 5

Figure 17:
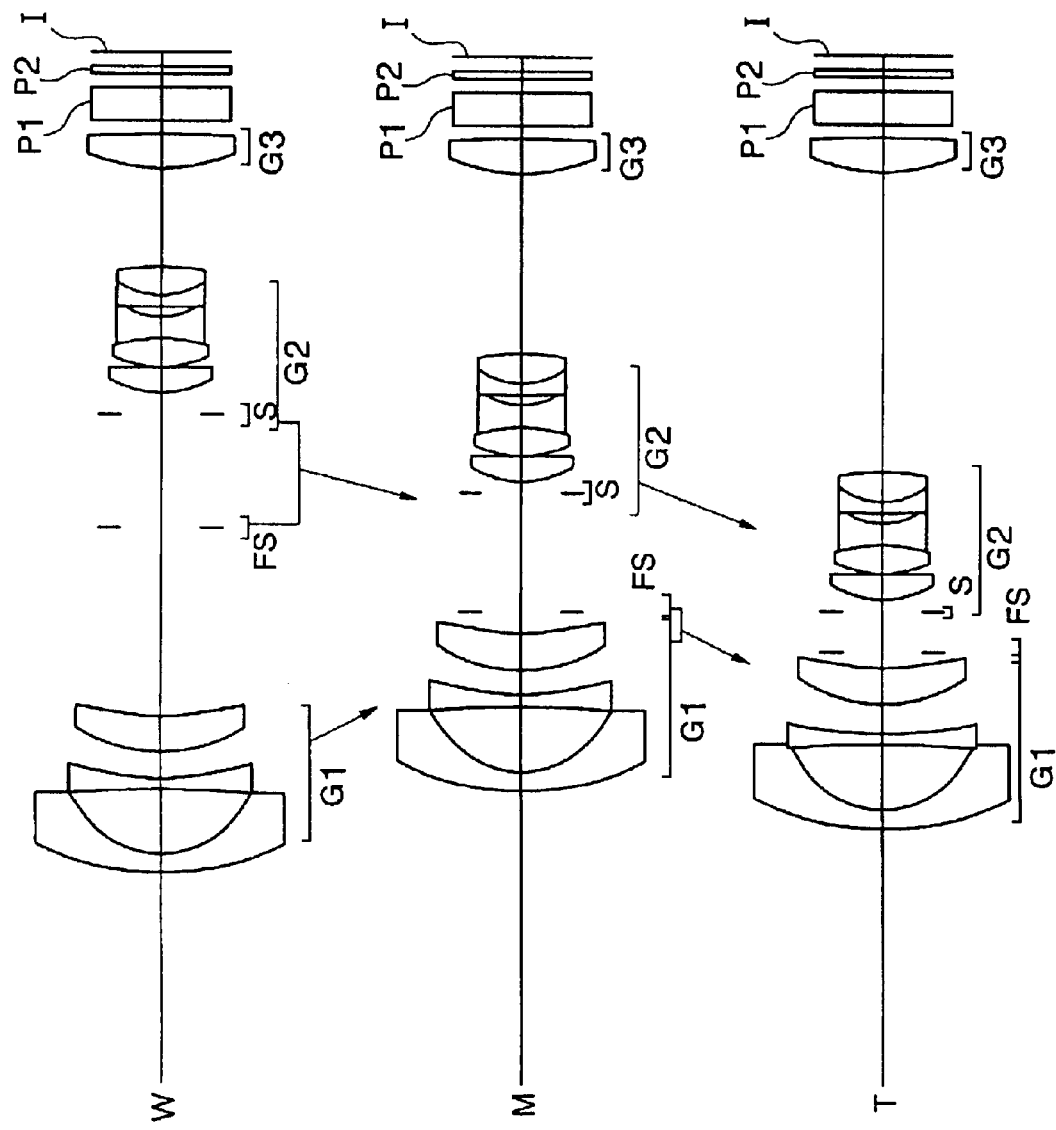
FIG. 17 is a sectional view showing the lens arrangement of a zoom lens system according to Example 5 of the second embodiment of the present invention, together with the movement of each lens group when the state of lens group positions varies from the wide-angle end state W to the telephoto end state T through a certain intermediate focal length state M.

FIG. 17 is a sectional view showing the lens arrangement of a zoom lens system according to Example 5 of the second embodiment of the present invention, together with the movement of each lens group when the state of lens group positions varies from the wide-angle end state W to the telephoto end state T through a certain intermediate focal length state M.

The zoom lens system is composed of, in order from the object along an optical axis, a first lens group G1 having negative refractive power, a fixed stop FS, a second lens group G2 having positive refractive power, and a third lens group G3 having positive refractive power.

The first lens group G1 is composed of, in order from the object, a negative meniscus lens having a convex surface facing to the object and an aspherical surface facing to the image, a double concave negative lens having a stronger concave surface facing to the image, and a positive meniscus lens having a convex surface facing to the object.

The second lens group G2 is composed of, in order from the object, an aperture stop S, a double convex positive lens having a stronger convex, aspherical surface facing to the object, a negative cemented lens constructed by a double convex positive lens cemented with a double concave negative lens, and a positive cemented lens constructed by a negative meniscus lens having a convex surface facing to the object cemented with a double convex positive lens.

The third lens group G3 is composed of, in order from the object, a double convex positive lens having a stronger convex, aspherical surface facing to the object.

When the state of lens group positions varies from the wide-angle end state W to the telephoto end state T, the distance between the first lens group G1 and the second lens group G2 decreases.

When the state of lens group positions varies from the wide-angle end state W to a certain intermediate focal length state M, the distance between the first lens group G1 and the fixed stop FS decreases as the fixed stop FS is moved with the second lens group G2 in a body.

When the state of lens group positions varies from the certain intermediate focal length state M to the telephoto end state T, the distance between the fixed stop FS and the second lens group G2 decreases as the fixed stop FS is moved with the first lens group G1 in a body.

Moreover, the third lens group G3 is substantially fixed relative to the image plane when the state of lens group positions varies from the wide-angle end state W to the telephoto end state T.

Various values associated with Example 5 are listed in Table 5.

TABLE 5

(Specifications)

| focal length | W | M | T |
|---|---|---|---|
| f | 7.40 | 13.22 | 21.30 |
| FNO | 2.9 | 3.8 | 5.0 |
| ω | 38.8 | 23.6 | 15.0 |

(Lens Data)

| surface number | radius of curvature | surface distance | nd | ν |
|---|---|---|---|---|
| 1 | 26.3278 | 1.700 | 1.74001 | 48.16 |
| 2 | 8.1533 | 5.750 | | |
| 3 | −174.3801 | 0.900 | 1.48749 | 70.24 |
| 4 | 23.4928 | 2.400 | | |
| 5 | 17.9444 | 3.200 | 1.84666 | 23.78 |
| 6 | 33.9654 | (D6) | | |
| 7 | ∞ | (D7) | Fixed Stop FS | |
| 8 | ∞ | 0.500 | Aperture Stop S | |
| 9 | 10.3019 | 2.550 | 1.66547 | 55.18 |
| 10 | −69.6160 | 0.100 | | |
| 11 | 14.8088 | 2.550 | 1.60562 | 43.73 |
| 12 | −14.8001 | 2.000 | 1.80100 | 34.96 |
| 13 | 7.8543 | 0.900 | | |
| 14 | 27.6364 | 0.900 | 1.80100 | 34.96 |
| 15 | 8.6622 | 2.700 | 1.61272 | 58.75 |
| 16 | −25.3313 | (D16) | | |
| 17 | 29.5916 | 2.300 | 1.66547 | 55.18 |
| 18 | −258.5473 | 1.922 | | |
| 19 | ∞ | 2.760 | 1.45850 | 68.00 |
| 20 | ∞ | 1.441 | | |
| 21 | ∞ | 0.500 | 1.51680 | 64.20 |
| 22 | ∞ | (Bf) | | |

(Aspherical Data)
Surface Number 2

κ = 0.1000
C4 = +1.18060E-04
C6 = +7.93980E-07
C8 = −2.26350E-09
C10 = +7.95490E-11
Surface Number 9

κ = 1.0000
C4 = −6.65950E-05
C6 = −3.23530E-07
C8 = +3.34640E-09
C10 = −1.01760E-10
Surface Number 17

κ = 1.0000
C4 = −1.16570E-05

TABLE 5-continued

C6 = +1.10140E-06
C8 = −2.62900E-08
C10 = +2.73560E-10

(Variable intervals upon zooming)

| focal length | W | M | T |
|---|---|---|---|
| f | 7.40 | 13.22 | 21.30 |
| D6 | 16.4238 | 1.2000 | 1.2000 |
| D7 | 11.0000 | 11.0000 | 3.6711 |
| D16 | 8.5310 | 16.2158 | 26.8626 |
| Bf | 1.0300 | 1.0157 | 0.9880 |

Figure 18:
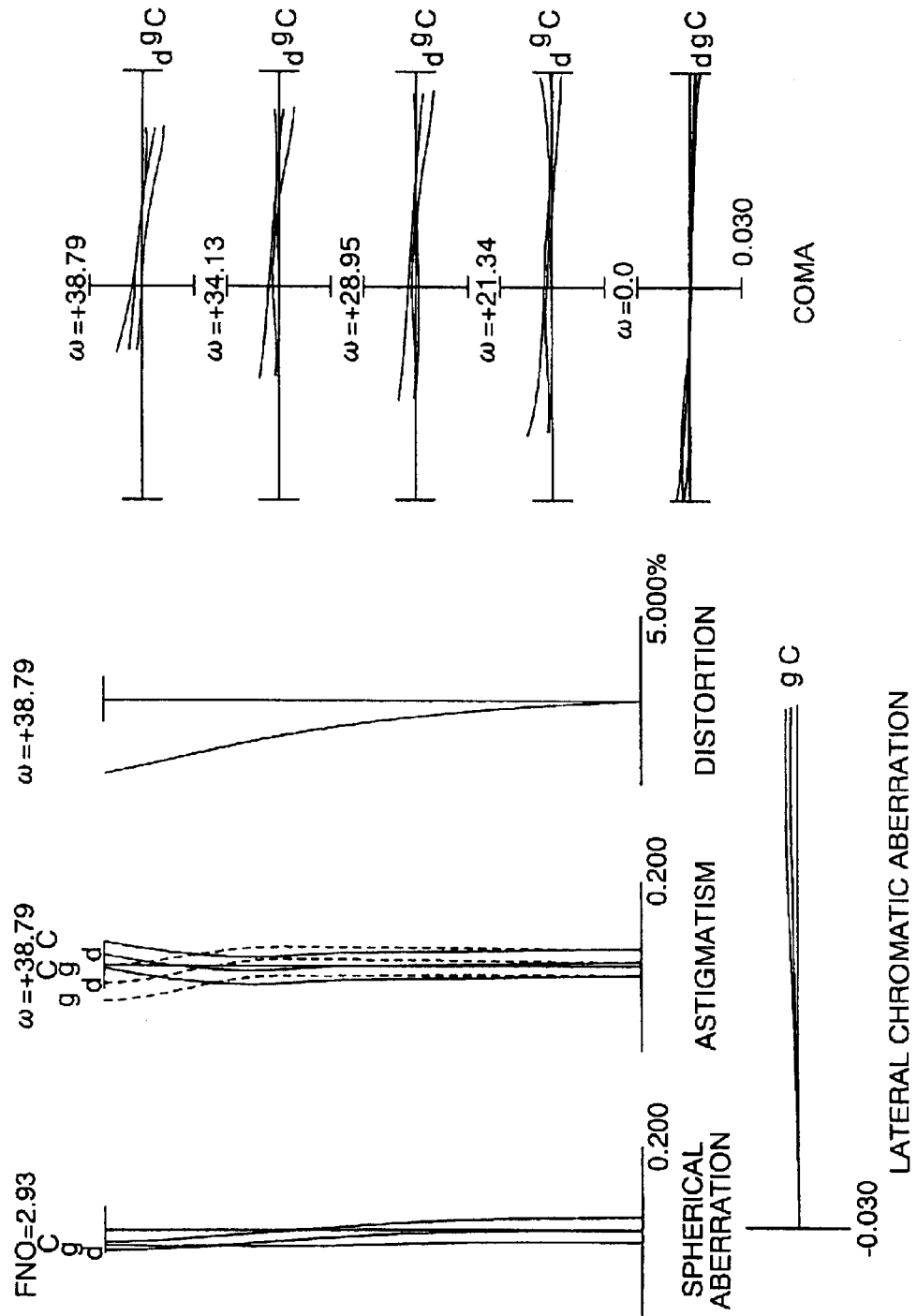
FIG. 18 graphically shows various aberrations of the zoom lens system according to Example 5 of the second embodiment in the wide-angle end state W.
Figure 19:
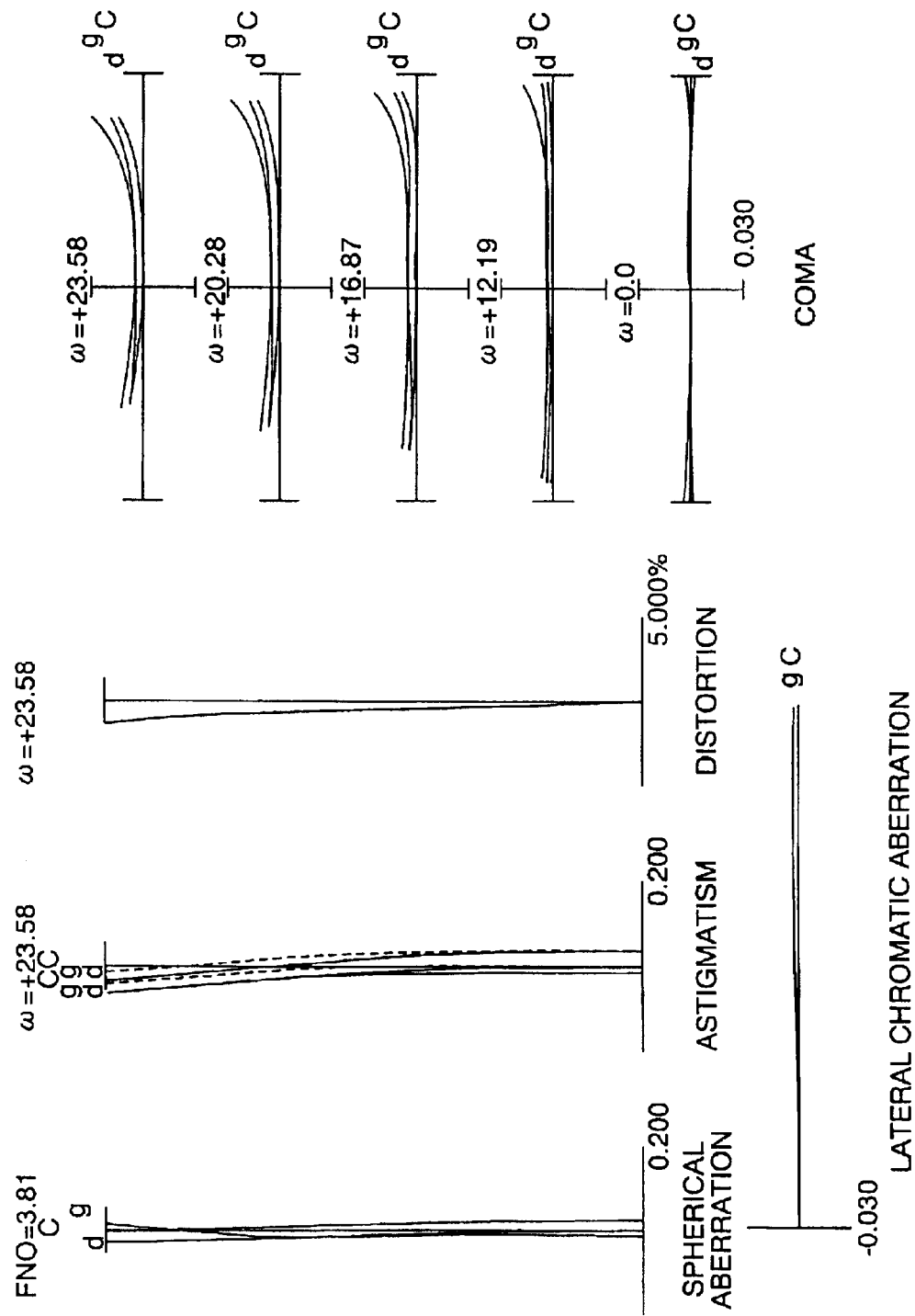
FIG. 19 graphically shows various aberrations of the zoom lens system according to Example 5 of the second embodiment in the certain intermediate focal length state M.
Figure 20:
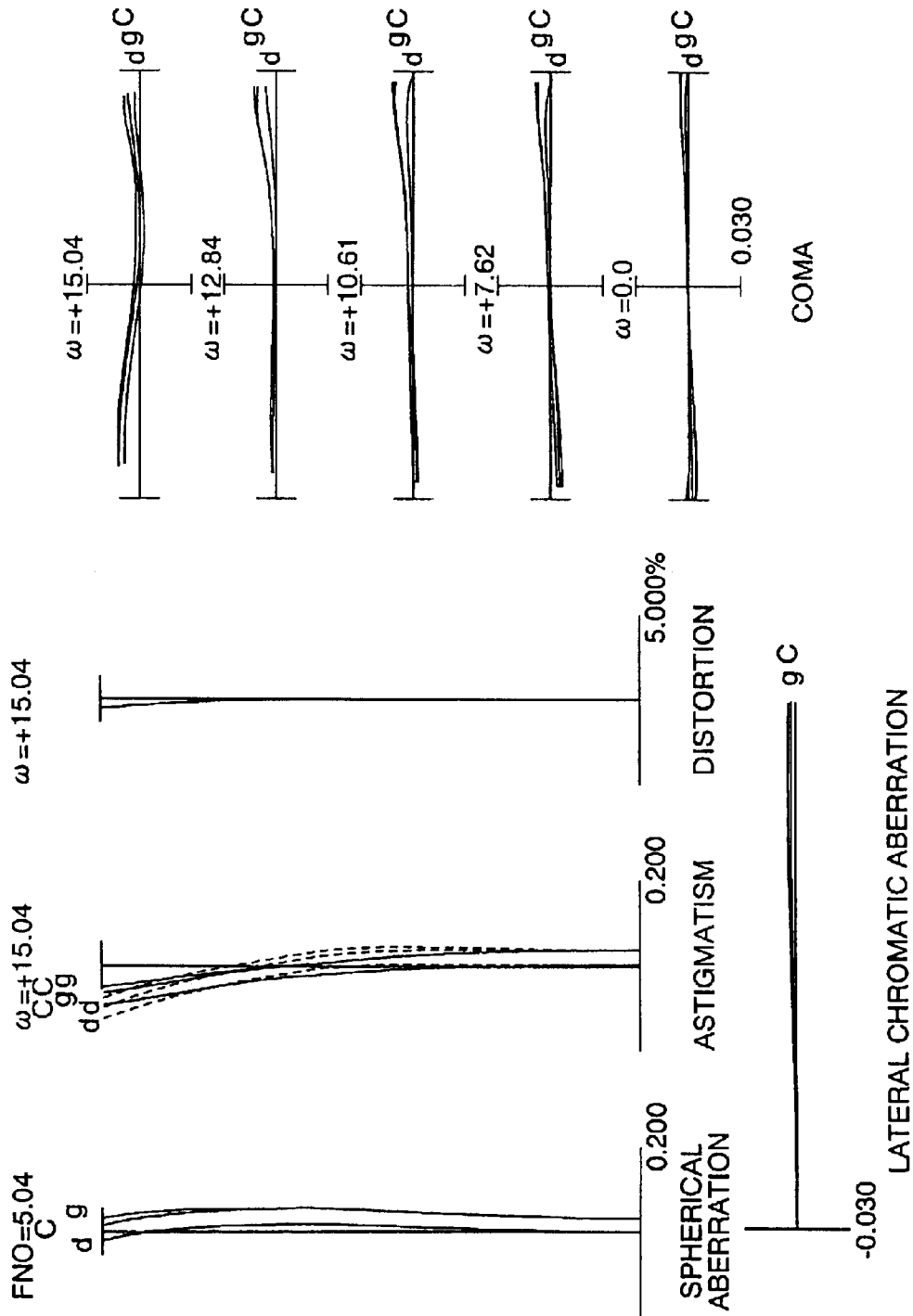
FIG. 20 graphically shows various aberrations of the zoom lens system according to Example 5 of the second embodiment in the telephoto end state T.

(Values for the conditional expressions)

fW = 7.40
fM = 13.22
fT = 21.30
D1W = 16.4238
D2W = 11.5000
FNOT = 5.0
ΦFS = 7.40
ΦST = 8.08
(5) $fM/(fW \cdot fT)^{1/2} = 1.05$
(6) $D2W/(D1W + D2W) = 0.41$
(7) $\Phi FS \cdot FNOT/fT = 1.74$
(8) $\Phi FS/\Phi ST = 0.92$ FIGS. 18, 19, 20 graphically show various aberrations of the zoom lens system according to Example 5 of the second embodiment in the wide-angle end state W, the certain intermediate focal length state M, and the telephoto end state T, respectively.

As is apparent from the respective graphs showing various aberrations, excellent compensation is made for various aberrations, in particular for flare component in the periphery and for chromatic aberration caused by chromatic coma to accomplish higher optical performance.

EXAMPLE 6

Figure 21:
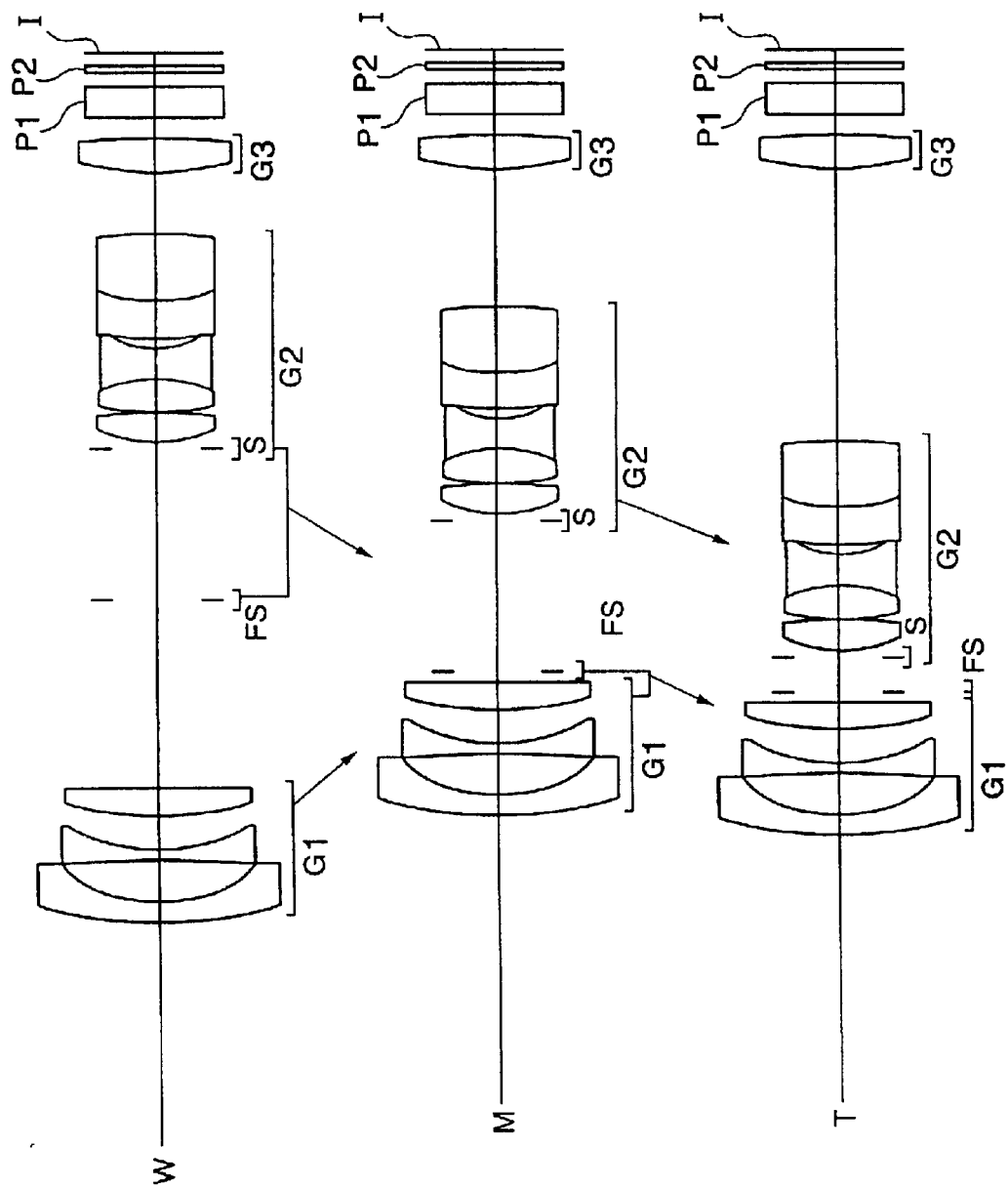
FIG. 21 is a sectional view showing the lens arrangement of a zoom lens system according to Example 6 of the second embodiment of the present invention, together with the movement of each lens group when the state of lens group positions varies from the wide-angle end state W to the telephoto end state T through a certain intermediate focal length state M.

FIG. 21 is a sectional view showing the lens arrangement of a zoom lens system according to Example 6 of the second embodiment of the present invention, together with the movement of each lens group when the state of lens group positions varies from the wide-angle end state W to the telephoto end state T through a certain intermediate focal length state M.

The zoom lens system is composed of, in order from the object along an optical axis, a first lens group G1 having negative refractive power, a fixed stop FS, a second lens group G2 having positive refractive power, and a third lens group G3 having positive refractive power.

The first lens group G1 is composed of, in order from the object, a negative meniscus lens having a convex surface facing to the object and an aspherical surface facing to the image, a double concave negative lens having a stronger concave surface facing to the image, and a positive meniscus lens having a convex surface facing to the object.

The second lens group G2 is composed of, in order from the object, an aperture stop S, a double convex positive lens having a stronger convex, aspherical surface facing to the object, a negative cemented lens constructed by a double convex positive lens cemented with a double concave negative lens, and a positive cemented lens constructed by a negative meniscus lens having a convex surface facing to the object cemented with a double convex positive lens.

The third lens group G3 is composed of, in order from the object, a double convex positive lens having a stronger convex, aspherical surface facing to the object.

When the state of lens group positions varies from the wide-angle end state W to the telephoto end state T, the distance between the first lens group G1 and the second lens group G2 decreases.

When the state of lens group positions varies from the wide-angle end state W to a certain intermediate focal length state M, the distance between the first lens group G1 and the fixed stop FS decreases as the fixed stop FS is moved with the second lens group G2 in a body.

When the state of lens group positions varies from the certain intermediate focal length state M to the telephoto end state T, the distance between the fixed stop FS and the second lens group G2 decreases as the fixed stop FS is moved with the first lens group G1 in a body.

Moreover, the third lens group G3 is substantially fixed relative to the image plane when the state of lens group positions varies from the wide-angle end state W to the telephoto end state T.

Various values associated with Example 6 are listed in Table 6.

TABLE 6

(Specifications)

| focal length | W | M | T |
|---|---|---|---|
| f | 10.00 | 16.58 | 28.70 |
| FNO | 2.9 | 3.6 | 5.0 |
| ω | 31.1 | 19.2 | 11.3 |

(Lens Data)

| surface number | radius of curvature | surface distance | nd | ν |
|---|---|---|---|---|
| 1 | 36.7383 | 1.800 | 1.620410 | 60.29 |
| 2 | 11.6827 | 3.900 | | |
| 3 | −210.7132 | 0.900 | 1.487490 | 70.24 |
| 4 | 14.5031 | 3.100 | | |
| 5 | 24.4594 | 2.500 | 1.686190 | 34.17 |
| 6 | 331.2016 | (D6) | | |
| 7 | ∞ | (D7) | Fixed Stop FS | |
| 8 | ∞ | 0.500 | Aperture Stop S | |
| 9 | 11.0922 | 2.850 | 1.665470 | 55.18 |
| 10 | −61.3936 | 0.100 | | |
| 11 | 23.1227 | 3.100 | 1.720000 | 43.69 |
| 12 | −10.2681 | 2.600 | 1.801000 | 34.96 |
| 13 | 7.9981 | 1.000 | | |
| 14 | 26.5196 | 3.500 | 1.846660 | 23.78 |
| 15 | 15.8829 | 5.700 | 1.670030 | 47.25 |
| 16 | −101.9984 | (D16) | | |
| 17 | 30.0000 | 2.800 | 1.665470 | 55.18 |
| 18 | −637.9762 | 2.314 | | |
| 19 | ∞ | 2.760 | 1.45850 | 68.00 |
| 20 | ∞ | 1.441 | | |
| 21 | ∞ | 0.500 | 1.51680 | 64.20 |
| 22 | ∞ | (Bf) | | |

(Aspherical Data)
Surface Number 2

κ = 6.4000
C4 = −5.94220E-06
C6 = −6.28170E-07
C8 = +9.76000E-09
C10 = −1.25630E-10

Surface Number 9

κ = 1.0000
C4 = −6.46070E-05
C6 = −1.23420E-07
C8 = −1.47870E-09
C10 = +9.18190E-12

TABLE 6-continued

Surface Number 17

κ = 1.0000
C4 = −1.62740E-05
C6 = +9.90660E-07
C8 = −2.33760E-08
C10 = +2.37190E-10

(Variable intervals upon zooming)

| focal length | W | M | T |
|---|---|---|---|
| f | 10.00 | 16.58 | 28.70 |
| D6 | 17.3570 | 1.0000 | 1.0000 |
| D7 | 14.0000 | 14.0000 | 3.5000 |
| D16 | 5.8764 | 12.8260 | 25.6313 |
| Bf | 1.0271 | 1.0230 | 1.0102 |

(Values for the conditional expressions)

fW = 10.00
fM = 16.58
fT = 28.70
D1W = 17.3570
D2W = 14.5000
FNOT = 5.0
ΦFS = 8.80
ΦST = 9.32
(5) fM/(fW · fT)$^{1/2}$ = 0.98
(6) D2W/(D1W + D2W) = 0.46
(7) ΦFS · FNOT/fT = 1.53
(8) ΦFS/ΦST = 0.94

Figure 22:
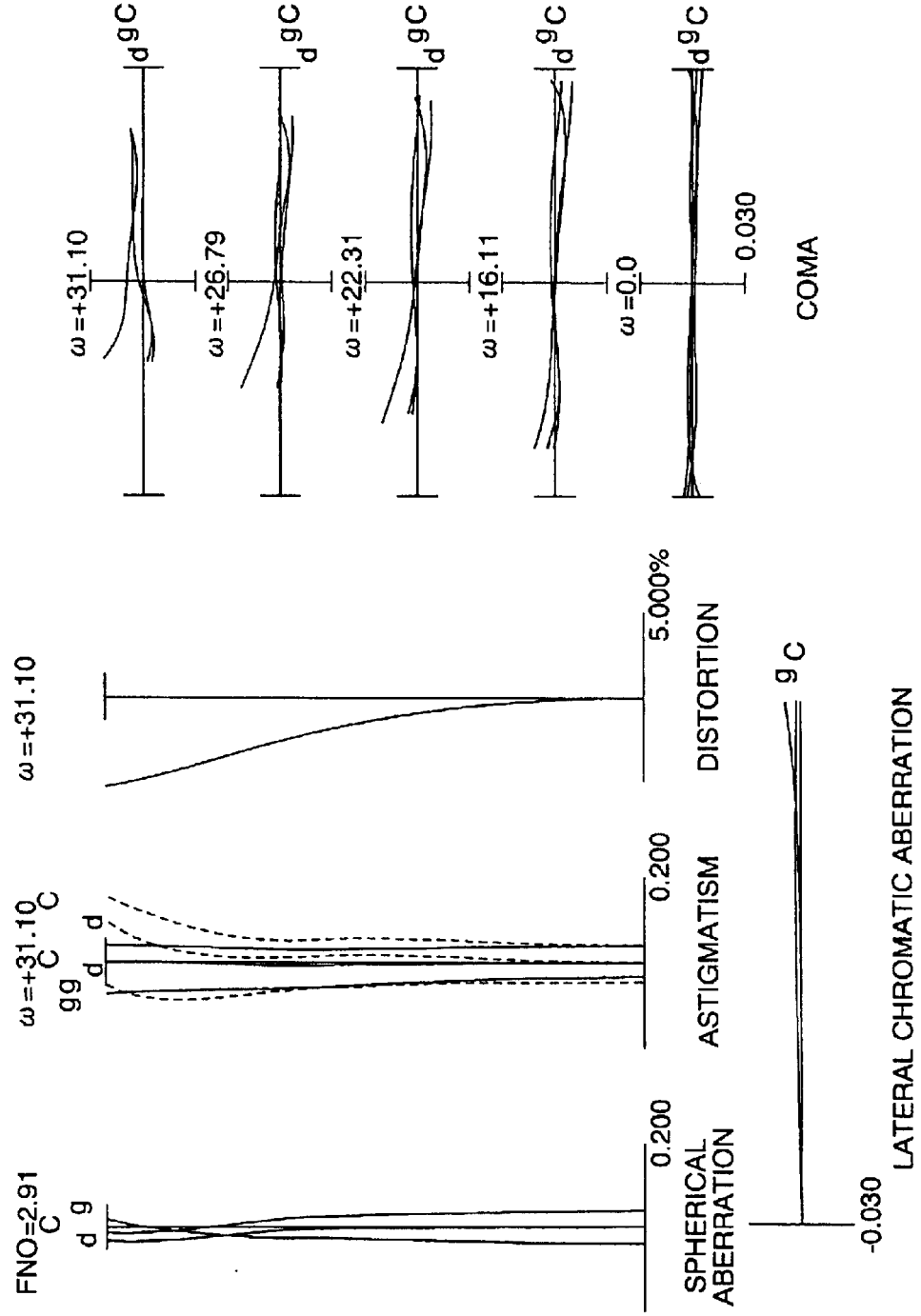
FIG. 22 graphically shows various aberrations of the zoom lens system according to Example 6 of the second embodiment in the wide-angle end state W.
Figure 23:
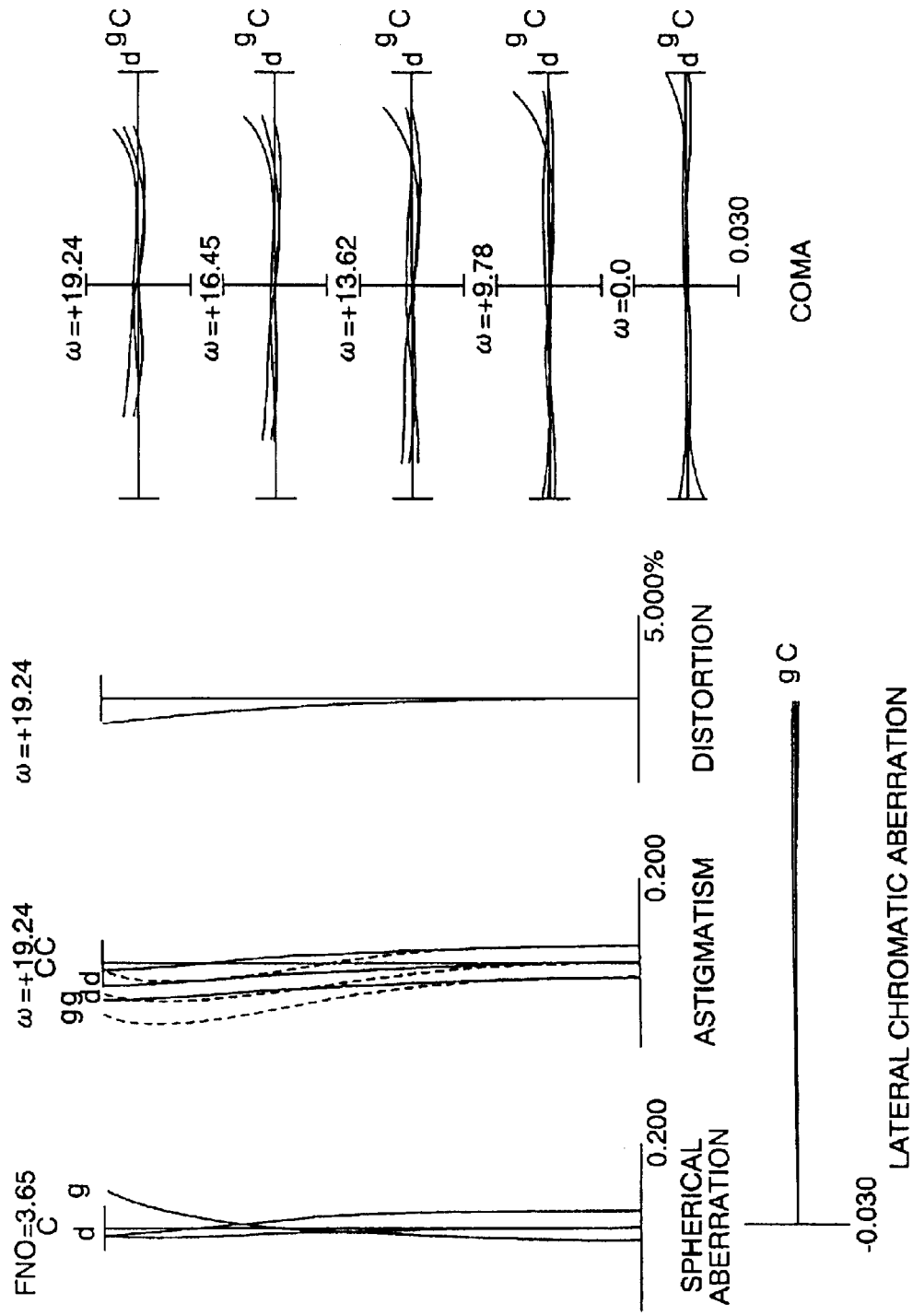
FIG. 23 graphically shows various aberrations of the zoom lens system according to Example 6 of the second embodiment in the certain intermediate focal length state M.
Figure 24:
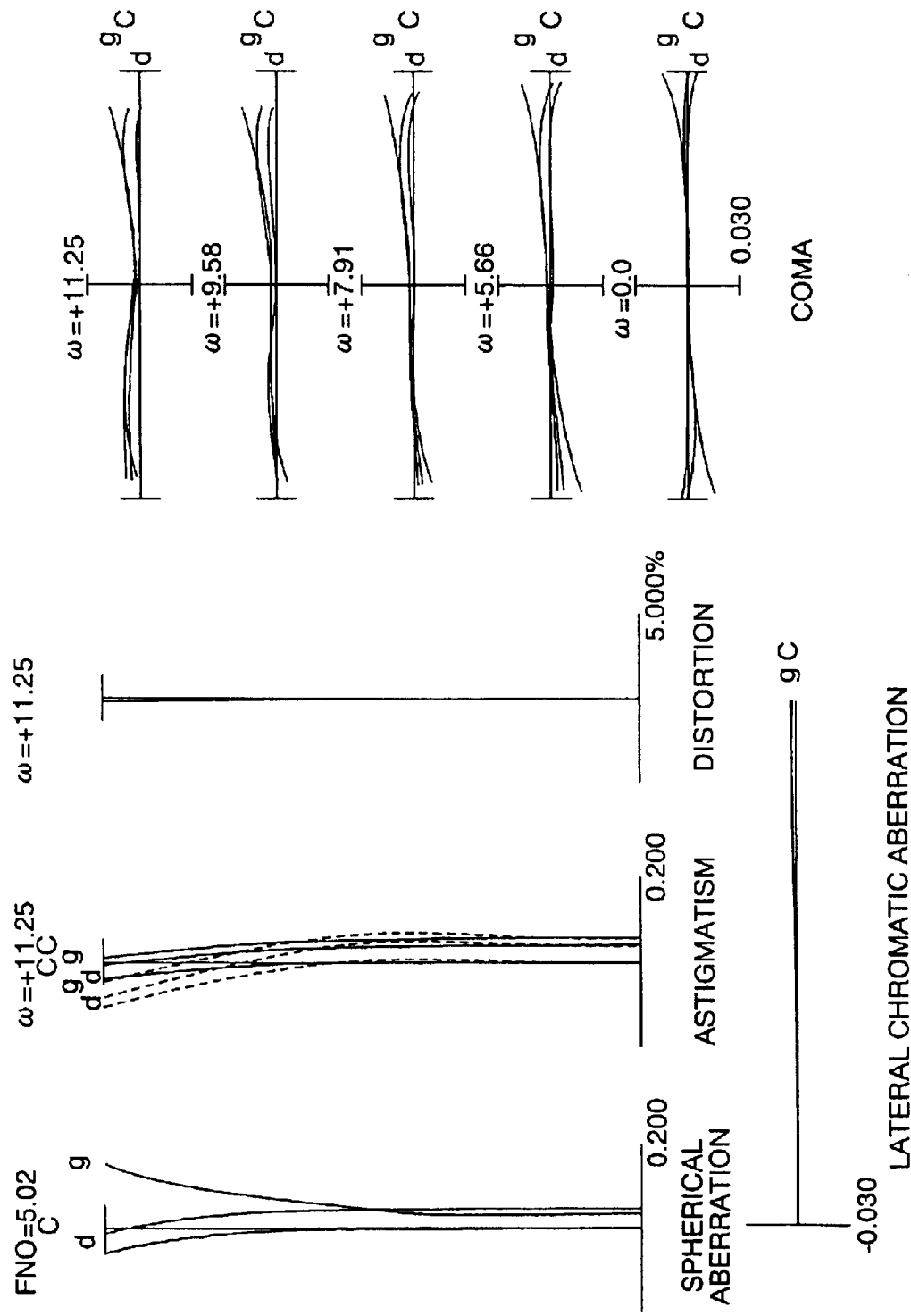
FIG. 24 graphically shows various aberrations of the zoom lens system according to Example 6 of the second embodiment in the telephoto end state T.

FIGS. 22, 23, 24 graphically show various aberrations of the zoom lens system according to Example 6 of the second embodiment in the wide-angle end state W, the certain intermediate focal length state M, and the telephoto end state T, respectively.

As is apparent from the respective graphs showing various aberrations, excellent compensation is made for various aberrations, in particular for flare component in the periphery and for chromatic aberration caused by chromatic coma to accomplish higher optical performance.

The present invention makes it possible to provide a compact zoom lens system having a zoom ratio about two to four, a small amount of flare component in the periphery, a small amount of chromatic aberration, and higher optical performance across the entire image, suitable for a video camera and an electronic still camera using an imaging device such as a solid state imaging device.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object along an optical axis;
   a first lens group having negative refractive power; and
   a second lens group having positive refractive power;
   a fixed stop being arranged between the first lens group and the second lens group;
   a distance between the first lens group and the second lens group decreasing when the state of lens group positions varies from a wide-angle end state to a telephoto end state;
   when the state of lens group positions varies from the wide-angle end state to a certain intermediate focal length state, a distance between the first lens group and the fixed stop decreasing as the fixed stop is moved with the second lens group in a body; and
   when the state of lens group positions varies from the certain intermediate focal length state to the telephoto end state, a distance between the second lens group and the fixed stop decreasing as the fixed stop as moved with the first lens group in a body.

2. The zoom lens system according to claim 1, wherein the second lens group has an aperture stop; and
   wherein the following conditional expressions are satisfied;

$0.80 < fM/(fW \cdot fT)^{1/2} < 1.30$ $0.25 < D2W/(D1W+D2W) < 0.65$ $\phi FS \cdot FNOT/fT > 1.40$ $\phi FS/\phi ST < 1.20$ where
   fW denotes the focal length of the zoom lens system in the wide-angle end state;
   fM denotes the focal length of the zoom lens system in the certain intermediate focal length state;
   fT denotes the focal length of the zoom lens system in the telephoto end state;
   D1W denotes the distance between the most image side surface of the first lens group and the fixed stop in the wide-angle end state;
   D2W denotes the distance between the fixed stop and the most object side surface of the second lens group in the wide-angle end state;
   FNOT denotes f-number of the zoom lens system in the telephoto end state;
   ϕFS denotes the diameter of the fixed stop; and
   ϕST denotes the maximum diameter of the aperture stop in the telephoto end state.

3. The zoom lens system according to claim 2, further comprising a third lens group having positive refractive power located to the image side of the second lens group, wherein the third lens group is substantially fixed relative to the image plane when the state of lens group positions varies from the wide-angle end state to the telephoto end state.

4. The zoom lens system according to claim 1, further comprising a third lens group having positive refractive power located to an image side of the second lens group, wherein the third lens group is substantially fixed relative to the image plane when the state of lens group positions, varies from the wide-angle end state to the telephoto end state.

* * * * *